United States Patent
Yasui et al.

(10) Patent No.: US 8,596,711 B2
(45) Date of Patent: Dec. 3, 2013

(54) VEHICLE BODY FRONT STRUCTURE

(75) Inventors: Ken Yasui, Wako (JP); Eisei Higuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/433,899

(22) Filed: Mar. 29, 2012

(65) Prior Publication Data

US 2012/0248820 A1 Oct. 4, 2012

(30) Foreign Application Priority Data

Apr. 1, 2011 (JP) .................................. 2011-081950
Dec. 2, 2011 (JP) .................................. 2011-264260

(51) Int. Cl.
*B62D 21/15* (2006.01)
(52) U.S. Cl.
USPC .................................. 296/187.09; 296/187.1
(58) Field of Classification Search
USPC .............. 296/187.09, 187.1, 193.09; 280/784
See application file for complete search history.

(56) References Cited

U.S. PATENT DOCUMENTS 6,957,846 B2 * 10/2005 Saeki .......................... 296/187.1

FOREIGN PATENT DOCUMENTS

JP 2000-053022 2/2000
* cited by examiner

*Primary Examiner* — Joseph Pape
*Assistant Examiner* — Dana Ivey
(74) *Attorney, Agent, or Firm* — Rankin, Hill & Clark LLP

(57) ABSTRACT

A vehicle front part structure efficiently absorbs collision energy upon a narrow offset collision in which a collision object, such as an oncoming vehicle, makes a front collision with a vehicle outer side outer than a front side frame, and thereby inhibits the vehicle body front part from moving rearward to the vehicle interior side. The vehicle front part includes a pair of left/right front side frames extending along the longitudinal direction of the vehicle, and a power unit disposed at the longitudinal center between the left/right front side frames. The left/right front side frames beside the power unit include branch frames extending toward the vehicle laterally outer side. The rear end portions of the branch frames penetrate the outer surface of the left/right front side frames and extend along an inner wall. Connection members are provided at the front portions of the left/right front side frames.

14 Claims, 16 Drawing Sheets

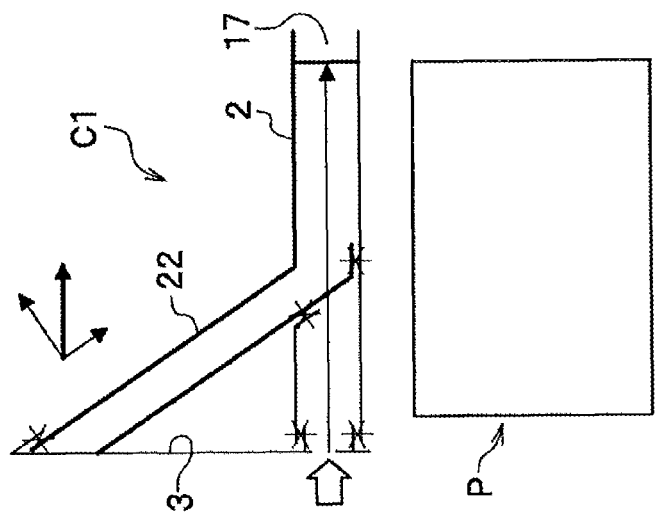
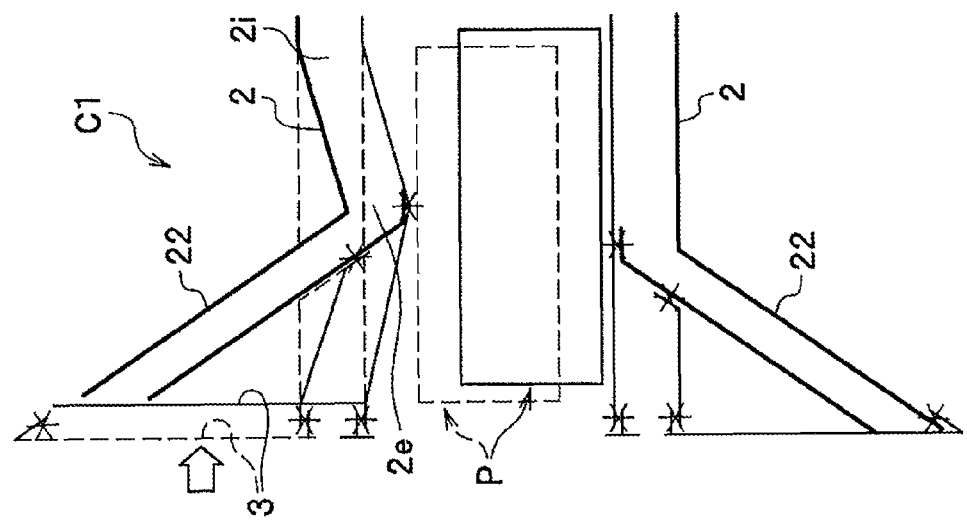
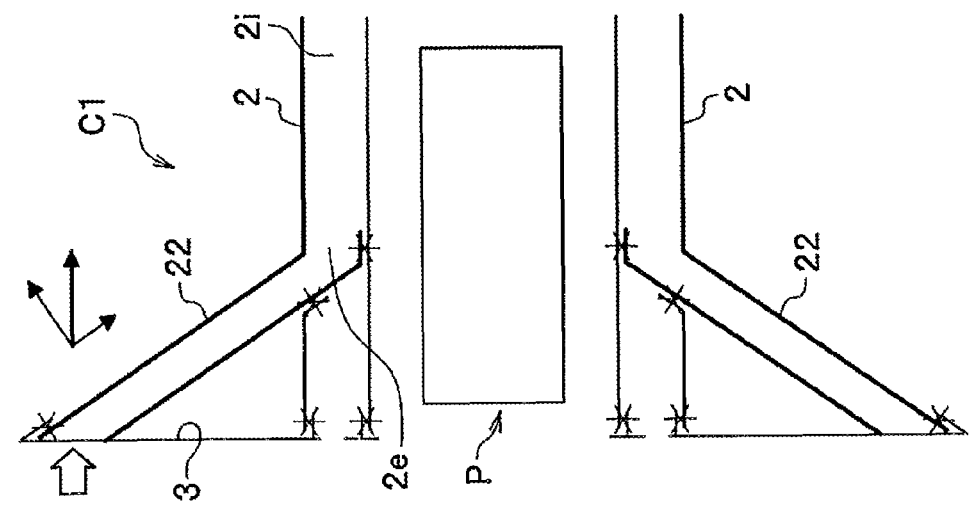

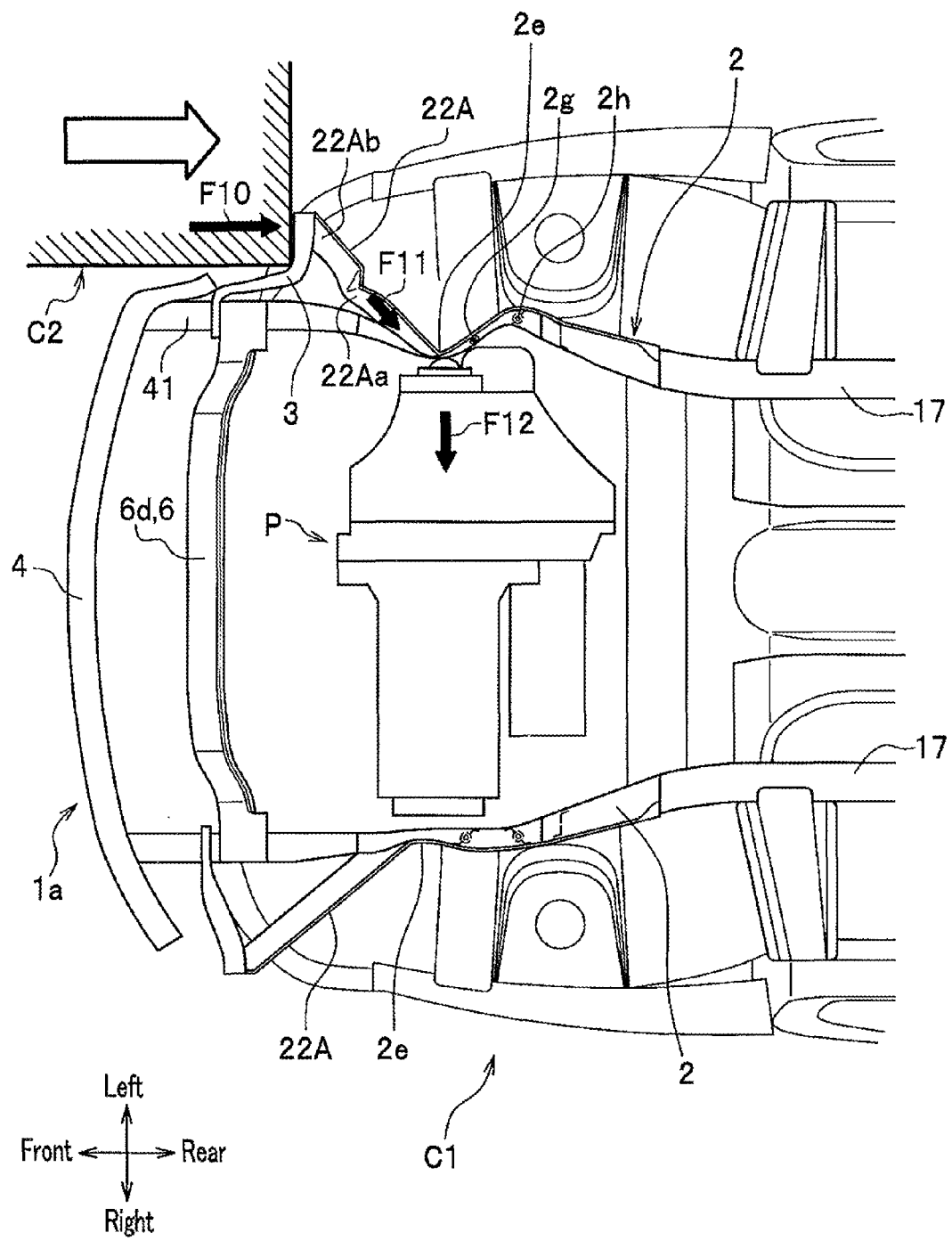

VEHICLE BODY FRONT STRUCTURE

CROSS REFERENCE TO RELATED APPLICATIONS

This application claims the foreign priority benefit under 35 U.S.C. §119 of Japanese Patent Application No. 2011-081950 filed on Apr. 1, 2011, and Japanese Patent Application No. 2011-264260 filed on Dec. 2, 2011, the disclosure of which is incorporated herein by reference.

FIELD OF THE INVENTION

The present invention relates to a vehicle body front structure, and particularly relates to a vehicle body front structure with improved energy absorptivity of front side frames upon offset collision by an obstacle, such as an oncoming vehicle, at a position off to the right side or the left side of the front end of the vehicle.

RELATED ART

Conventionally, a vehicle body structure is known wherein the vehicle body structure absorbs collision energy upon an offset collision by an oncoming vehicle in such a manner that a bumper beam receives a collision force, and while the collision force crushing a front side frame (side beam) with pressure, the collision force is converted into a side load by an angled frame, which is provided from the front side frame and directed in the oblique outer forward direction, to bend the front side frame and bottoms an engine (for example, refer to Patent Document 1 (Japanese Patent Laid-open Application No. 2000-53022 (FIG. 4)).

With this vehicle body structure, when an angled frame, which is provided at the front side frame to reduce the deceleration of passengers upon a head-on collision of the vehicle, has received a collision force, the angled frame presses the front side frame to bend and deform the front side frame with a side load from the vehicle laterally outer side toward the vehicle laterally inner side, thereby making the collision reaction force large in the early stage of the collision and small in the middle stage and after.

PROBLEMS TO BE SOLVED BY THE INVENTION

However, with a conventional vehicle body structure, as described above, when a vehicle has made an offset collision, particularly when the vehicle has made a front collision at a position, where a collision object has collided the vehicle body, is on the side outer than the front side frame with respect to the vehicle lateral direction (hereinafter, such front collision will be referred to as a 'narrow offset collision'), the collision force does not sufficiently transfers to the front side frame, causing a low absorptivity of collision energy.

FIG. 18 is a main part schematic diagram showing a state that the vehicle described in Patent Document 1 has made a narrow offset collision with an oncoming vehicle.

With the vehicle body structure described in Patent Document 1, as shown in FIG. 18, when an oncoming vehicle C2 has made a narrow offset collision with a vehicle C1, the collision force is not applied to a front side frame 100, and a load B is applied to an angled frame 200 only, wherein a force Fy along the vehicle traverse direction is small and accordingly the front side frame 100, which is thick and has a large strength, cannot be bent only by the angled frame 200.

Consequently, when the vehicle C1 has made a narrow offset collision, it is desirable that, further, the front side frame 100 is deformed along the vehicle lateral direction to press the side surface of a power unit and thereby move the power unit toward the other side, and the front side frame 100 is deformed until the power unit comes in contact with a front side frame on the other side so that the collision energy (collision force) is absorbed.

In other words, when the oncoming vehicle C2 has made a narrow offset collision, which is a front collision on the side outer than the front side frame 100 of the vehicle C1, it is desirable that the front side frame 100 is further deformed to decrease the reward movement amount of the movement of the vehicle body front part back to the vehicle interior side and thereby reduce deformation of members constructing the vehicle interior.

SUMMARY OF THE INVENTION

In this situation, the present invention has been developed to solve the problem described above, and an object of the invention is to provide a vehicle front part structure capable of efficiently absorbing collision energy when a collision object such as an oncoming vehicle has made a narrow offset collision, which is a front collision on the side outer than a front side frame of a vehicle, to reduce reward movement of the vehicle front part to the vehicle interior side.

A vehicle body front structure according to the present invention includes: a pair of left and right front side frames arranged at a front part of a vehicle body and extending in a longitudinal direction of the vehicle body; and a power unit disposed at a longitudinal center between the left and right front side frames, wherein each of the left and right front side frames includes a branch frame extending along an oblique forward direction on a vehicle laterally outer side from the left or right front side frame beside the power unit, wherein a rear end portion of the branch frame penetrates an outer surface of the left or right front side frame and extends along an inner wall of the left or right front side frame, and wherein a front end portion of the branch frame is connected with a front portion of the left or right front side frame through a connection member.

With such a structure, when the vehicle has made a narrow offset collision with a collision object, a collision force is applied to the front end portion of the branch frame. As the front end of the branch frame is drawn by the connection member, the collision force is transferred along the angled branch frame in the direction toward to the power unit side, and the inner wall of the front side frame is thereby deformed. The front side frame presses the side surface of the power unit to laterally move the power unit toward the other side until the power unit comes in contact with the front side frame on the other side so that the front side frame is deformed.

Accordingly, such a front side frame can increase the absorptivity of collision energy, corresponding to the deformation amount along the vehicle lateral direction and the movement amount of the power unit, compared with a structure where a front side frame is not deformed in the vehicle lateral direction upon collision. As a result, it is possible to inhibit the front side frame from moving reward and deforming such as to enter the vehicle interior side, and thereby reduce effects on the members forming the vehicle interior.

Further, it is also possible to reduce transfer of the front collision force through the branch frame to side sills, floor frames, a cross member, and the like which form the periphery of the interior, and deformation of the interior caused by the transfer of the collision force.

Further, each of the left and right front side frames preferably includes a fragile portion provided posterior to a connection portion for connection with the branch frame.

With such a structure, as the fragile portion is provided posterior to the connection portion for connection with the branch frame, when the vehicle has made a narrow offset collision, the branch frame is pressed by a collision force applied to the tip end portion of the branch frame so that the fragile portion is broken. The front side frame promotes easy deformation of the fragile portion toward the power unit side, and deforms such as to press the power unit to the front side frame side that is on the opposite side. By the deformation thereof, the front side frame absorbs the collision energy, and thereby, the absorptivity of collision energy upon a narrow offset collision can be improved.

Still further, a mount portion for supporting the power unit is preferably arranged posterior to the fragile portion.

With such a structure, as the mount portion of each of the front side frames is arranged posterior to the fragile portion, the portion of the front side frame where the mount portion is provided is reinforced so that the fragile portion anterior to the mount portion easily deforms. Consequently, when the vehicle has made a collision, the fragile portion deforms to absorb collision energy, and the mount portion can be thereby protected.

Yet further, it is preferable that each of the left and right front side frames is formed in a tube shape in a vertical cross-sectional view, and wherein each of the mount portions includes a partition member for longitudinally partitioning inside the left or right front side frame.

With such a structure, as each of the mount portions is provided with the partition member for longitudinally partitioning inside the left or right front side frame, the peripheral part of the mount portion disposed posterior to the fragile portion has a high rigidity, and the fragile portion of the front side frame thereby easily deforms toward the side surface of the power unit, which promotes deformation, caused by collision, of the front side frame toward the power unit side.

Further, the each connection member is preferably formed by a plate member disposed posterior to a bumper beam, at an end portion on the vehicle laterally outer side, or at a front end portion of a bumper beam extension.

With such a structure, the each connection member is formed by a plate member disposed posterior to the bumper beam, at the end portion on the vehicle laterally outer side, or at the front end portion of the bumper beam extension, and it is thereby possible to make the shapes of the corners of a bumper face disposed anterior to the bumper beam be in a small R so that the degree of freedom of designing is improved. Further, the connection member is connected to the front end portion of the branch frame in a state that the connection member is disposed at the bumper beam or the bumper beam extension, and the front end portion of the branch frame can thereby be firmly connected with the bumper beam or the bumper beam extension and thus supported.

Still further, it is preferable that each of the front side frames includes a front side frame main body formed substantially in an angular C-shape in a vertical cross-sectional view, wherein each of the branch frames includes: a side frame engagement portion formed along the longitudinal direction; and an angled portion formed from a front end of the side frame engagement portion toward an oblique forward direction on the vehicle laterally outer side, and wherein the side frame engagement portion is connected inside an opening portion of the front side frame main body.

With such a structure, the each branch frame is connected inside the opening portion of the front side frame main body and the rear end portion of the branch frame is thus fixed by the plate shaped portion that forms the inner wall surface of the opening portion. The connection portion is accordingly formed with a weaker strength than other portions of the tube (hollow) structure to deform with a comparatively weaker collision force. Therefore, upon a narrow offset collision of the vehicle with an obstacle, when the collision force applied to the branch frame presses the connection portion in the opening portion of the front side frame main body, the connection portion deforms to make it possible to surely bend the front side frame. Consequently, the bending deformation of the front side frame enables absorption of the collision energy.

Yet further, the branch frame is preferably formed such as to have a rigidity free from axial crush by a reaction force from the power unit upon collision.

With such a structure, as the branch frame has a rigidity free from axial crush by a reaction force from the power unit upon collision, the collision force applied to the branch frame presses the power unit through the front side frame, and the power unit presses the fragile portion of the front side frame on the other side, making it possible to absorb the collision energy.

Further, the branch frame is preferably formed such as to have a rigidity that is axially crushed by a reaction force from the power unit upon collision.

With such a structure, the branch frame is formed such as to have a rigidity that is axially crushed by a reaction force from the power unit upon collision, and accordingly, when a collision force is applied to the branch frame, the branch frame itself is crushed to be able to absorb the collision energy.

Still further, the vehicle body front structure preferably includes: outer bumper beam extensions disposed at respective front end portions of the branch frames and also function as the connection members; inner bumper beam extensions disposed at respective front portions of the left and right front side frames; a bumper beam disposed at front ends of the inner bumper beam extensions and the outer bumper beam extensions; upper members extending forward from front pillars; and lower members extending forward downward from the upper members, wherein front end portions of the respective lower members are disposed outer than the front side frames and connected to rear end portions of the outer bumper beam extensions.

With such a structure, for example, when the vehicle has made a narrow offset collision, with an oncoming vehicle, in a state of a low speed drive, a collision force smaller than that at a high speed drive is applied to the end portion of the bumper beam on a vehicle laterally outer side, and thereby rearward presses the end portion of the bumper beam on the vehicle laterally outer side. The lower member and the branch frame supports the end portion of the bumper beam on the vehicle laterally outer side against the collision force to crush the bumper beam extension, and the collision force is thereby absorbed. Thus, it is possible to prevent deformation of the vehicle body frames, such as the lower member, the branch frame, and the front side frame. Therefore, in case of repairing the vehicle thereafter, it is only necessary to replace the outer bumper extension and the bumper beam, and the repair cost for the vehicle can be reduced.

Further, when the vehicle has made a narrow offset collision, with an oncoming vehicle, in a state of a high speed drive, a collision force larger than that during a low speed drive is applied to the end portion, on a vehicle laterally outer side, of the bumper beam, and thereby rearward presses the end portion of the bumper beam on the vehicle laterally outer side. The collision force crushes the outer bumper beam extension, and the branch frame presses and bends the front side frame, and the lower member deforms and absorbs the collision force, while supporting the front side frame with a reaction force.

Consequently, even if the front side frame is short in the longitudinal direction, the front side frame can efficiently absorb the collision force at the front part of the vehicle body, and it is thereby possible to reduce deformation of members constructing the vehicle interior, which is posterior to the vehicle body front part.

The inner bumper beam extensions and the outer bumper beam extensions are preferably connected by fitting plates.

With such a structure, as each of the inner bumper beam extensions is connected with the corresponding outer bumper beam extension by a fitting plate, upon a narrow offset collision of the vehicle with an obstacle, the branch frame is displaced such as to rearward draw the fitting plate in addition to the bumper beam (connection member) and thus presses the front side frame. Thus, the collision force can be transferred, with a greater extent directed along the angled branch frame and toward the power unit side. Consequently, the branch frame can be deformed so that the power unit presses the front side frame side on the opposite side. As a result, the front side frames absorb the collision energy by the deformation thereof, which enables improving the absorptivity of collision energy upon a narrow offset collision.

According to the present invention, it is possible to provide a vehicle body front structure capable of efficiently absorbing collision energy upon a narrow offset collision, which is a front collision by a collision object, such as an oncoming vehicle, on a vehicle laterally outer side than a front side frame, and thereby reducing rearward movement of the vehicle body front part toward the vehicle interior side.

BRIEF DESCRIPTION OF THE DRAWINGS

FIGS. 8A to 8C are schematic diagrams showing states when the vehicle with the vehicle body front structure according to the invention has made a narrow offset collision, wherein FIG. 8A is a diagram showing a state before the collision; FIG. 8B is a diagram showing a deformation state upon a collision on the outer side than a front side frame by an oncoming vehicle; FIG. 8C is a diagram showing a deformation state upon a collision on the front side of the front side frame by an oncoming vehicle;

FIG. 9 is a diagram showing a first modified example according to the invention, and is a main part schematic bottom view showing a deformation state in an early stage of a narrow offset collision of a vehicle with an oncoming vehicle;

PREFERRED EMBODIMENT OF THE INVENTION

A vehicle body front structure according to an embodiment of the present invention will be described below, referring to FIGS. 1 to 8C.

The description will be made, representing the direction of movement of a vehicle C1 by 'forward or front', the direction of moving rearward by 'rearward', on the vertically upper side by 'upper', the vertically lower side by 'lower', and the vehicle lateral direction by 'left' and 'right'.

Structure of Vehicle

First, a vehicle C1 to which the present invention is applied will be described prior to description of a vehicle body front structure according to an embodiment of the present invention.

Figure 1:
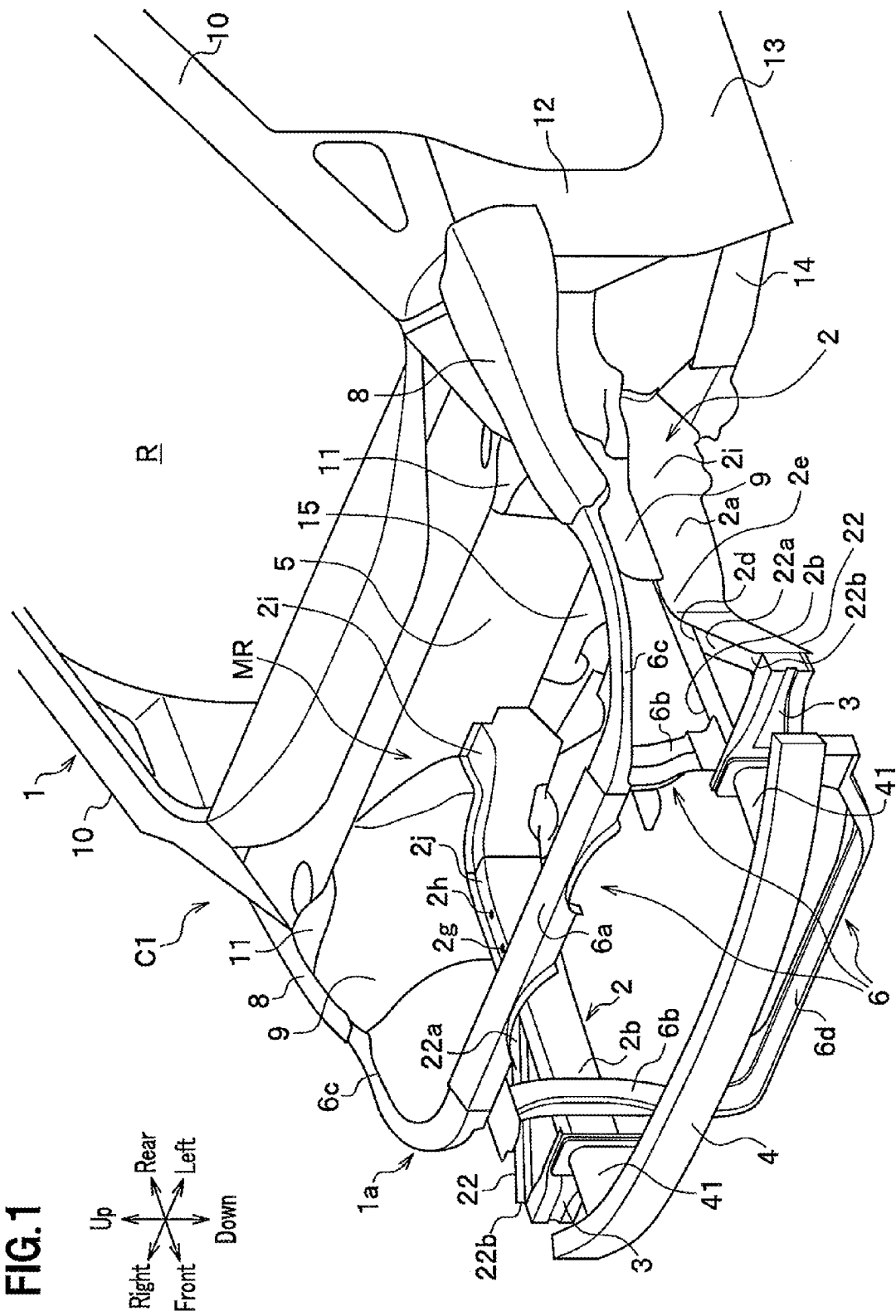
FIG. 1 is a main part schematic perspective view showing a vehicle body front structure according to an embodiment of the present invention.

As shown in FIG. 1, the vehicle C1 has a motor room MR in a vehicle front part 1a, and is an automobile having a vehicle interior R (passenger room) with a partition wall portion 5 between the vehicle interior R and the motor room MR, for example, a FR (front engine/rear drive) vehicle, a four wheel drive vehicle, or the like.

The type or kind of the vehicle C1 is not particularly limited as long as an automobile has a power unit P (refer to FIG. 2), such as an engine, an electric motor, in a motor room MR. The invention will be described below, taking an example of a case of a FR vehicle.

Structure of Vehicle Body

As shown in FIG. 1, a vehicle body 1 is used to form the entire vehicle C1, and mainly includes various metallic vehicle body frames, for example, front side frames 2, a bonnet, not shown, metallic vehicle body panels, such as a fender panel, a bumper face (not shown) of resin or metal, and the like. A vehicle body front part 1a of the vehicle 1 is provided with later described front side frames 2, connection members 3, a bumper beam 4, a partition wall portion 5, a front bulkhead 6, front wheel house upper members 8, front wheel houses 9, front pillar uppers 10, damper bases 11, front pillar lowers 12, side sills 13, outriggers 14, a cross member 15 (refer to FIG. 2), tunnel frames 16 (refer to FIG. 2), floor frames 17 (refer to FIG. 2), and the like in left/right pairs and substantially left-right symmetrically.

As the vehicle front part 1a is substantially left-right symmetric, the left side of the vehicle body 1 will be mainly described below, and description of the right side of the vehicle body 1 will be omitted, as appropriate.

Structure of Motor Room

Figure 2:
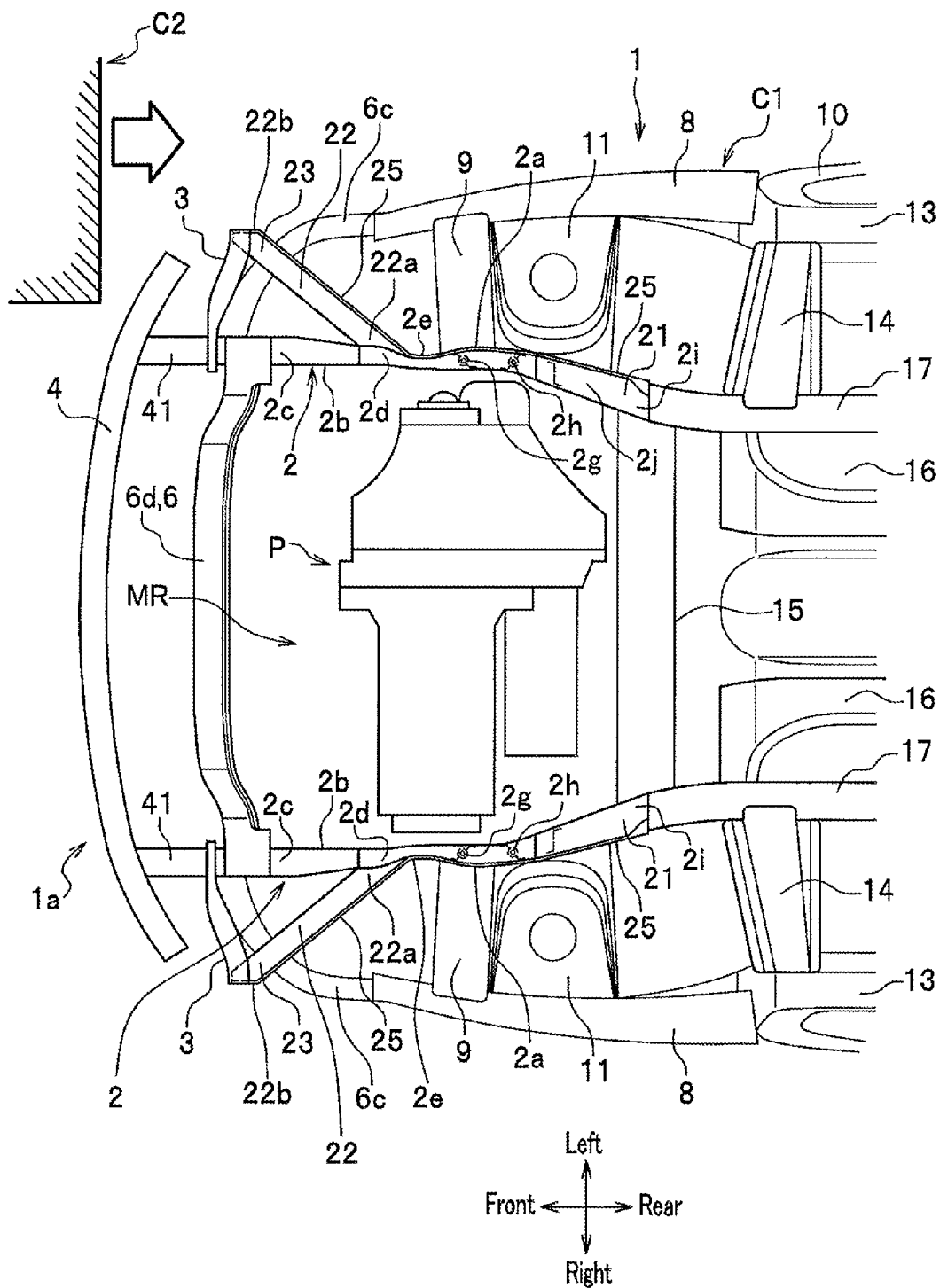
FIG. 2 is a main part schematic bottom view showing the vehicle body front structure according to the embodiment of the invention.

As shown in FIG. 2, the motor room MR is a housing space where the power unit P is disposed, and is formed by frames and panel members installed in the periphery of the power unit P. The front bulkhead 6, the bumper beam 4, and the like are arranged anterior to the motor room MR, and the partition wall portion 5 (refer to FIG. 1), the cross member 15, and the like are arranged posterior to the motor room MR. Further, at the upper left and the upper right of the motor room MR and directed in the vehicle body longitudinal direction, there are arranged pairs of bulkhead upper sides 6c, front wheel house upper members 8, front wheel houses 9, dumper bases 11, and front pillar uppers 10. At the lower left and the lower right of the motor room MR and directed in the longitudinal direction of the vehicle body 1, there are arranged a pair of front side frames 2.

The motor room MR, the front side frames 2, and branch frames 22 form a crush stroke which is pressed and crushed to absorb collision energy when the vehicle C1 has made a head-on collision, an offset collision, or a narrow offset collision.

Structure of Partition Wall Portion

As shown in FIG. 1, the partition wall portion 5 is a member for partitioning the motor room MR and the vehicle interior R, and is formed by, for example, a dashboard main body, not shown, of steel plates or the like, dashboard members being frame members, a reinforcing frame for reinforcement, and the like.

Structure of Front Bulkhead

As shown in FIG. 1, the front bulkhead 6 is a frame member that forms the vehicle body front part of the motor room MR, and is disposed being directed along the vehicle lateral direction as a whole. The front bulkhead 6 is formed by connecting a bulkhead upper 6a, bulkhead side stays 6b, bulkhead upper sides 6c, and a bulkhead lower 6d, substantially in a rectangular shape such as to enclose the outer circumferential portion of a radiator (not shown).

As shown in FIG. 1, the bulkhead upper 6a is a frame member forming the upper portion of the front bulkhead 6 substantially in a frame shape.

The bulkhead side stays 6b are frame members arranged downward from the left and right end portions of the bulkhead upper 6a toward the upper side of the front end portion of the front side frames 2, and thus form the left and right side portions of the front bulkhead 6.

The bulkhead upper sides 6c are frame members in an arc shape in a plan view continuously arranged from the left and right end portions of the bulkhead upper 6a, and the front wheel house upper members 8 are extended posterior to the bulkhead upper sides 6c toward the vehicle body rear side.

The bulkhead lower 6d is a frame member forming the lower portion of the front bulkhead 6, and is disposed facing the bulkhead upper 6a and in parallel to the lower side of the bulkhead upper 6a.

Structures of Front Wheel House Upper Members, and Front Pillar Upper and Lower Members The front wheel house upper members 8 are frame members arranged on the upper side of the vehicle body side parts at the motor room MR and along the vehicle longitudinal direction. The front wheel house upper members 8 are arranged such that the front ends are connected to the bulkhead upper sides 6c, the rear ends are connected to the front pillar uppers 10, and the lower sides are connected with the front wheel houses 9 and the dumper bases 11.

The front pillar uppers 10 are frame members disposed at the left and right side portions of a front glass (not shown), and the rear ends of the front pillar uppers 10 are connected to side rails disposed at roof side surface portions, not shown.

Structure of Power Unit

As shown in FIG. 2, the power unit P includes, for example, an engine and a transmission, and is disposed at the longitudinal center between the left and right front side frames 2. The power unit P is placed through mount members, not shown, on mount portions 2g, 2h provided at the front side frames 2.

Structure of Front Side Frame

As shown in FIG. 2, the front side frames 2 are a pair of left/right frame members arranged at the vehicle body front part 1a and extending in the longitudinal direction of the vehicle body 1, and are formed, for example, by a steel angular pipe material which is rigid from the front end to the rear end and has a cross-section substantially in a hollow rectangular shape (tube form). Each front side frame 2 has an outer surface 2a, an inner side surface 2b, a front portion 2c, a connection portion 2d, a fragile portion 2e, an inner wall 2f, mount portions 2g, 2h, an upper surface 2j, a front side frame main body 21, a branch frame 22, a first side plate 24, a second side plate 25, a first partition member 26, a second partition member 27, and a third partition member 28, and the like which will be described later.

As shown in FIG. 2, the rear half portions of the front side frames 2 are extending straight along the longitudinal direction, and the front portions 2c of the front side frames 2 are connected with the left and right end portions of the bumper beam 4 of the vehicle body front part 1a through respective connection members 3 and bumper beam extensions 41. The rear half portions of the front side frames 2 are formed with a slight curve toward the vehicle laterally inner side, and the rear portions 2i are joined with floor frames 17 such as to extend rearward. Further, a cross member 15 is bridged between the rear portions 2i of the left and right side frames 2, 2.

The surface, on the vehicle laterally outer side, of each front side frame 2 is provided with the branch frame 22, which is extended from a longitudinally middle portion of the surface toward the oblique forward direction, and provided with the front wheel house 9, which is arranged from the middle portion of the branch frame 22 to the rear portion 2i.

Figure 3:
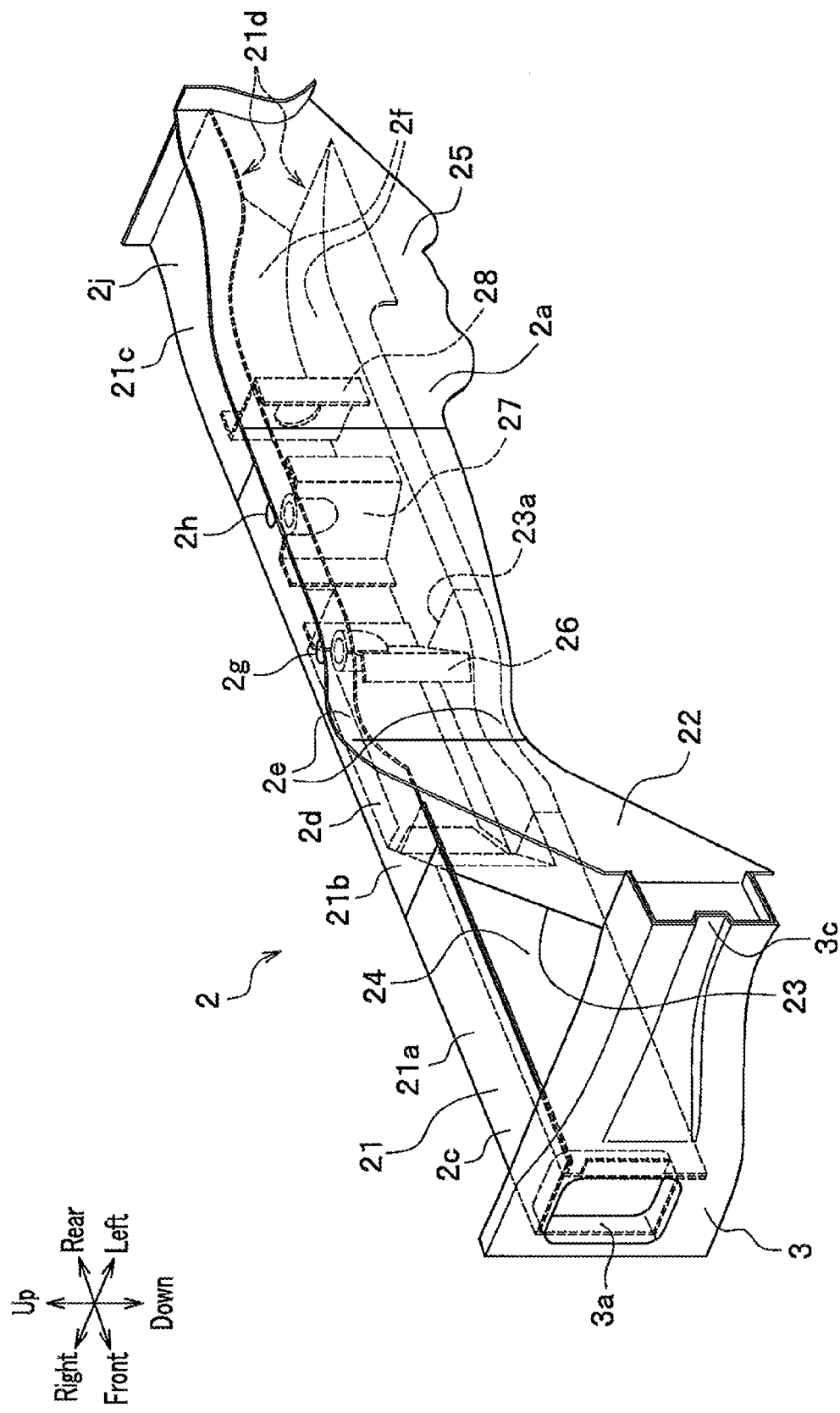
FIG. 3 is a schematic perspective view showing an installation state of a front side frame of the vehicle body front structure according to the embodiment of the invention.
Figure 4:
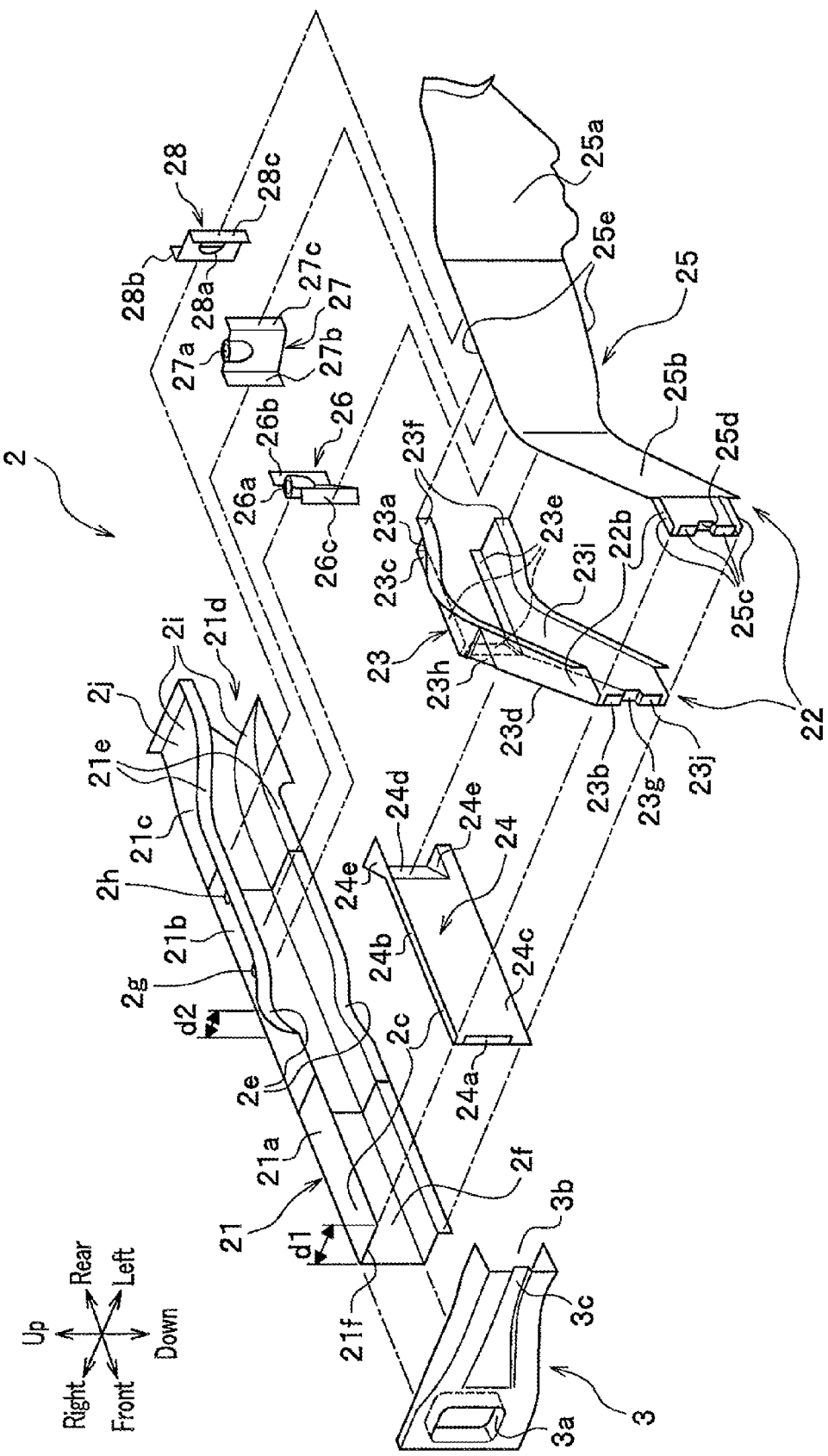
FIG. 4 is an exploded perspective view showing the front side frame of the vehicle body front structure according to the embodiment of the invention.

As shown in FIGS. 3 and 4, each front side frame 2 is integrally formed, for example, by welding the front side frame main body 21 of a channel steel disposed on the vehicle laterally inner side, the first side plate 24 joined such as to close the front half portion of an opening portion 21d of the front side frame main body 21 in an angular C-shape in a vertical cross-sectional view, the second side plate 25 joined such as to close the rear half portion of the opening portion 21d of the front side frame main body 21 and an opening portion 23i of a branch frame main body 23, the branch frame main body 23 whose rear end portion 23a is joined with the inner wall 2f at the central portion of the front side frame main body 21, and the first partition member 26, the second partition member 27, and the third partition member 28 which are joined with the inside of the opening portion 21d.

As shown in FIGS. 2 and 3, an outer surface 2a, on the vehicle laterally outer side, of the front side frame 2 is provided at the central portion thereof with the fragile portion 2e whose strength is lower than the other portions, and the branch frame 22 is arranged at a position in the vicinity anterior to the fragile portion 2e in a state of protruding in the oblique forward direction. The outer surface 2a is provided with the first side plate 24 (refer to FIG. 4) anterior to the branch frame 22, and the second side plate 25 is arranged overall from the front end portion 23b of the branch frame main body 23 to the rear half portion of the front side frame main body 21.

The inner side surface 2b, on the vehicle laterally inner side, of the front side frame 2 is formed such that the front half portion thereof is extending straight along the longitudinal direction, in a bottom view, and the rear half portion thereof is slightly curved toward the vehicle laterally inner side so that the distance between the left and right front side frames 2, 2 is slightly narrower.

At the connection portion 2d, the branch frame 22 is fixed to the front side frame 2 in a protruding state, wherein the branch frame 22, which is formed substantially in a dogleg shape, is fixed in a state of protruding toward the front oblique outer side from the central portion of the front side frame 2, the central portion being formed substantially in a linear shape in a plan view.

As shown in FIG. 4, the fragile portion 2e is formed with a narrower width d2 with respect to the vehicle lateral direction in a plan view than the width d1 of other portions of the front side frame 2 to have a weaker strength and is formed anterior to the mount portions 2g, 2h. The fragile portion 2e is formed in a state that the vehicle laterally outer side thereof is recessed in a plan view so that a part of a tire (not shown) disposed on the outer side of the fragile portion 2e evacuates upon collision.

As shown in FIGS. 3 and 4, the inner wall 2f is formed in a hollow rectangular shape in a vertical cross-sectional view, closing the opening portion 21d of the front side frame main body 21, which is substantially in an angular C-shape in a vertical cross-sectional view and is open on the outer side thereof with respect to the vehicle lateral direction, by the first side plate 24 and the second side plate 25. The inner wall 2f is joined with the rear half of the branch frame main body 23, the first partition member 26, the second partition member 27, and the third partition member 28.

The upper surface 2j of the front side frame is provided with a pair of mount portions 2g, 2h posterior to the fragile portion 2e with a certain distance between the mount portions 2g, 2h.

Mount members (not shown) for supporting the power unit P are fitted to the mount portions 2g, 2h. At the position inside the front side frame 2 where the front mount portion 2g is disposed, there is provided the first partition member 26 in a nodal form for longitudinally partitioning inside the front side frame 2. At the position inside the front side frame 2 where the front mount portion 2h is disposed, there is provided the second partition member 27 in a nodal form for longitudinally partitioning inside the front side frame 2.

Structure of Front Side Frame Main Body

As shown in FIG. 4, the front side frame main body 21 is a member substantially in an angular C-shape in a vertical cross-sectional view that forms the vehicle laterally inner side surface and the upper and lower surfaces of the front side frame 2, and is formed in a state of extending in the longitudinal direction. For the front side frame main body 21, for example, three members, namely, the front member portion 21a, the middle member portion 21b, the rear member portion 21c, are joined in a row along the longitudinal direction to be formed integrally. Further, the front side frame main body 21 is provided with the opening portion 21d, flange portions 21e formed on the fringes of the opening portion 21d, and the mount portions 2g, 2h.

The front member portion 21a is a member of thin channel steel forming the front end portion of the front side frame main body 21, and is formed in a state of straight extending in the longitudinal direction.

The middle member portion 21b is a member substantially in an angular C-shape in a vertical view forming the middle portion of the front side frame main body 21. The middle member portion 21b has the fragile portion 2e, the mount portions 2g, 2h with which the inserted first partition member 26 and second partition member 27 are joined, and has the inner wall 2f to which the welding portion 23e of the branch frame main body 23 is welded.

The rear member portion 21c is a member substantially in an angular C-shape in a vertical view forming the rear end portion side of the front side frame main body 21, and the rear portion 2i is formed such as to become laterally wider downward and toward the vehicle laterally outer side.

The opening portion 21d is a recessed portion of the front side frame main body 21 formed in a channel shape of steel, and is formed such that the vehicle laterally outer direction side of the front side frame main body 21 is wholly open. The opening portion 21d is closed at the front half portion thereof by the first side plate 24 and the at the rear half portion thereof by the second side plate 25. The branch frame main body 23 is inserted into the opening portion 21d from outside between the rear end of the first side plate 24 and the front end of the second side plate 25, and the welding portion 23e formed at a side frame engagement portion 23c of the branch frame 22 is welded with the inner wall 2f so that the rear half portion of the branch frame main body 23 is fixed inside the opening portion 21d. The flange portions 21e are flange shaped portions formed such that the upper and lower end portions of the opening portion 21d are bent in an L-shape, with which the flange portion 23f of the branch frame main body 23 and the upper and lower fringe portions of the side frame closing portion 25a of the second side plate 25 are joined.

Structure of Branch Frame

As shown in FIG. 2, the branch frame 22 is a frame member arranged such as to absorb collision energy upon reception of a collision force applied to the vehicle body 1 when a collision object (an oncoming vehicle C2) has made a narrow offset collision on the vehicle C1, by transferring the collision force through the front side frame 2 to the power unit P. The branch frame 22 is joined with the front side frame 2 such that the rear end portion 22a extends from the front side frame 2 beside the power unit P in the oblique forward direction on the vehicle laterally outer side, and the front end portion 22b is joined inside the outer side end portion of the connection member 3 substantially in an angular C-shape in a vertical view, in a state of being inserted in the outer side end portion.

As shown in FIG. 3, the branch frame 22 is formed substantially in a hollow rectangular shape in a vertical view by joining the branch frame main body 23 of a material in an angular C-shape in a vertical view and the second side plate 25 arranged such as to close the open portion formed on the angular C-shape, and has a rigidity free from axial crush by a reaction force from the power unit P (refer to FIG. 2) upon collision.

Structure of Branch Frame Main Body

As shown in FIG. 4, the branch frame main body 23 is a member formed in an angular C-shape in a vertical view and in a dogleg shape in a plan view. The rear half portion of the branch frame main body 23 is provided with the side frame engagement portion 23c connected with the inner wall 2f of the opening portion 21d of the front side frame main body 21, and the front half portion of the branch frame main body 23 is provided with an angled portion 23d protruding from the front side frame main body 21 toward the oblique forward direction. The branch frame main body 23 includes the rear end portion 23a, the front end portion 23b, the side frame engagement portion 23c, the angled portion 23d, the welding portion 23e, and the flange portion 23f, which will be described later.

The rear end portion 23a is joined with the inside of the opening portion 21d positioned anterior to the mount portion 2g, in a state of being inserted in the opening portion 21d.

The front end portion 23b is joined with the connection member 3 in a state that the front surface of the front end portion 23b is aligned with the branch frame connection portion 3b at the left end portion of the connection member 3, and the rear surface of the front end portion 23b is joined with the front end portion 25c of the second side plate 25. The central portion of the front end portion 23b is provided with a bent piece 23j having a recessed portion 23g that engages with a recessed portion 3c formed at the left end portion of the connection member 3 and the recessed portion 25d of the second side plate 25. The front end portion 23b of the branch frame main body 23, the front end portion 25c of the second side plate 25, and the branch frame connection portion 3b of the left end portion of the connection member 3 are joined by engaging the recessed portion 23g of the branch frame main body 23 with the recessed portions 25d and 3c and thus carrying out position definition.

As shown in FIG. 4, the side frame engagement portion 23c is a portion where the branch frame main body 23 is inserted inside the front side frame main body 21, and is formed at a rear half portion formed substantially straight along the longitudinal direction in a plan view.

The angled portion 23d is an angled portion of the branch frame main body 23 protruding from the front side frame main body 21, and is formed, in a plan view, oblique from the vicinity anterior to the fragile portion 2e toward the left end portion of the connection member 3.

The welding portion 23e is a portion for making the branch frame main body 23 contact and join with the side surface, on the inner side, of the inner wall 2f of the front side frame main body 21 by spot welding or the like. The welding portion 23e is an overlapping marginal portion where the upper side fringe portion, the lower side fringe portion, and the front side fringe portion, of the branch frame main body 23, are formed facing the inner wall 2f of the front side frame main body 21.

The flange portions 23f are flange form portions formed by bending the upper and lower opening ends of the branch frame main body 23 in an angular C-shape in a vertical view into an L-shape. The fringe portions 25e of the second side plate 25 are joined with the vehicle laterally outer side (left side) of the flange portion 23f. The fringe portions 21e of the front side frame main body 21 are joined with the vehicle laterally inner side (right side) of the side frame engagement portions 23c of the flange portion 23f.

Structure of First Side Plate

As shown in FIG. 4, the first side plate 24 is a plate member for closing the opening portion 21d of the front half portion of the front side frame main body 21 and is extended along the longitudinal direction. The outer circumferential fringe of the first side plate 24 includes a front side joint portion 24a, an upper side joint portion 24b, a lower side joint portion 24c, a rear side portion joint portion 24d, and a rear portion joint portion 24e.

The front side joint portion 24a is a bent piece bent in an L-shape, and is arranged such that the root end portion thereof closes the left side of the front end portion 21f inside the opening portion 21d of the front side frame main body 21, wherein the front surface thereof is joined with the left side of the circumferential fringe portion of the tube portion 3a of the connection member 3 (refer to FIG. 3).

The upper side joint portion 24b is a portion joined with the upper side inside the opening portion 21d of the front side frame main body 21, and is formed such as to be bent with the upper fringe portion of the first side plate 24 being directed in the left direction.

The lower side joint portion 24c is a portion joined with the lower side inside the opening portion 21d of the front side frame main body 21, and is arranged, facing the upper side joint portion 24b.

The rear side portion joint portion 24d is a portion joined with the side surface, on the right side, of the angled portion 23d of the branch frame main body 23, and is formed such that the rear end portion of the first side plate 24 is angled along the angled portion 23d.

The rear portion joint portions 24e are flat plate shaped portions substantially in a triangle shape formed on the upper and lower surfaces of the rear side portion joint portion 24d at the rear end portions of the upper side joint portion 24b and the lower side joint portion 24c. The rear portion joint portions 24e are joined by engagement with a stepped portion 23h substantially in a triangle shape formed on the upper and lower surfaces of the central portion of the branch frame main body 23.

Structure of Second Side Plate

The second side plate 25 is a plate shaped member, substantially in a dog leg shape in a plan view, that closes the opening portion 23i of the branch frame main body 23 and closes the rear half portion of the opening portion 21d of the front side frame main body 21. The second side plate 25 includes a side frame closing portion 25a, a branch frame closing section 25b, a front end portion 25c, a recessed portion 25d, and a circumferential fringe portion 25e, which will be described later.

The side frame closing portion 25a is a portion for closing the opening portion 21d of the front side frame main body 21, concretely, the posterior side from the fragile portion 2e, and is extended in the longitudinal direction.

The branch frame closing portion 25b is a portion for closing the opening portion 23i of the branch frame main body 23, and is extended oblique forward along the angled portion 23d.

The front end portion 25c is formed in an overlapping marginal form by bending the front surface, the upper surface, and the lower surface thereof are bent into an L-shape, and is joined with the inside of the front end portion 23b of the branch frame main body 23.

The recessed portion 25d is a recessed portion for position definition and is formed such as to align with the recessed portion 23g of the branch frame main body 23 and the recessed portion 3c of the connection member 3.

The circumferential fringe portion 25e is joined at the front half thereof with the flange portion 23f of the branch frame main body 23, and is joined at the rear half thereof with the flange portion 21e of the front side frame main body 21.

Structure of Partition Member

As shown in FIG. 4, the first partition member 26, the second partition member 27, and the third partition member 28 are partition members arranged such as to partition the inside of the mount portion 2g of the front side frame 2 in the longitudinal direction, and are members substantially in a plate shape arranged such as to close the inside of the front side frame 2 in a hollow rectangular shape in a vertical view. These partition members (26, 27, 28) also function as reinforcement members for improving the strength of the front side frame 2.

Structure of First Partition Member

The first partition member 26 is arranged in an oblique state inside the mount portion 2g anterior to the front side frame 2, wherein the bent portion 26c joined with the second side plate 25 is disposed on the front side. The first partition member 26 includes a fastening portion 26a for fixing a mount member (not shown), a bent portion 26b for joining the first partition member 26 with the inner wall 2f of the front side frame main body 21, and a bent portion 26c for joining the first partition member 26 with the second side plate 25.

The fastening portion 26a is a nut, with which a bolt for fastening a mount member (not shown) is screw-engaged, and is integrally formed with the upper central portion of the first partition member 26. The bent portions 26b, 26c are formed by bending the left and right end portions of the first partition member 26 such as to be along the longitudinal direction.

Structure of Second Partition Member

As shown in FIG. 4, the second partition member 27 is arranged inside the mount portion 2h, posterior to the front side frame 2, in an oblique state in a plan view such that a bent portion 27c side thereof that is joined with the second side plate 25 is on the rear side. The second partition member 27 includes a fastening member 27a for fixing a mount member (not shown), a bent portion 27b for joining the second partition member 27 with the inner wall 2f of the front side frame main body 21, and a bent portion 27c for joining the second partition member 27 with the second side plate 25.

The fastening portion 27a is a nut, with which a bolt for fastening a mount member (not shown) is screw-engaged, and is integrally formed with the upper central portion of the second partition member 27. The bent portions 27b, 27c are formed by bending the left and right end portions of the second partition member 27 such as to be along the longitudinal direction.

Structure of Third Partition Member

As shown in FIG. 4, the third partition member 28 is arranged inside the opening portion 21d, which is posterior to the second partition member 27 arranged in the front side frame 2, and along the left-right direction in a plan view. The third partition member 28 includes a hole 28a formed at the central part, a bent portion 28b for joining the third partition member 28 with the inner wall 2f of the front side frame main body 21, and a bent portion 28c for joining the third partition member 28 with the second side plate 25.

Structure of Connection Member

The connection member 3 is a plate member for connecting the front portion 2c of the front side frame 2 and the front end portion 22b of the branch frame 22, and is formed by a bumper plate disposed posterior to the bumper beam 4 and along the vehicle lateral direction. As shown in FIG. 4, the connection member 3 is provided with a tube portion 3a, a branch frame connection section 3b, and a recessed portion 3c.

The tube portion 3a is a portion inserted inside the front portion 2c of the front side frame 2 formed in an angular tube shape, and is formed in an angular tube shape.

The branch frame connection portion 3b is a portion for connecting the connection member 3 with the front end portion 22b of the branch frame 22, and is bent substantially in an angular C-shape such as to enclose the front end portion 22b of the front side frame 2 in a side view.

The recessed portion 3c is formed at the central portion of the branch frame connection portion 3b, and is a portion having roles of position definition and reinforcement. The recessed portion 3c is joined with the recessed portions 23g, 25d of the branch frame 22 by engagement.

Structure of Bumper Beam

As shown in FIGS. 1 and 2, the bumper beam 4 is a framework member formed by a steel material and is disposed at the vehicle body front portion 1a, extending along the vehicle lateral direction. The bumper beam 4 is bridged between the front ends of the left and right bumper beam extensions 41. A bumper face, not shown, is fixed to the front side of the bumper beam 4.

The bumper beam extensions 41 are shock-absorbing members for absorbing a shock upon front collision of the vehicle C1, and are arranged between the connection members 3 and the bumper beam 4.

Structures of Damper Bases, Front Pillar Lowers and Side Sills

As shown in FIG. 1, the dumper bases 11 are thick plate members that support the upper portions of front suspensions (not shown), and are connected to the upper and side portion of the motor room MR at the rear end portion of the front wheel house 9.

Each front pillar lower 12 is connected at the upper end thereof with the lower surface of the front end portion of the front pillar upper 10, and connected at the lower end thereof with the front end portion of the side sill 13.

Each side sill 13 is a hollow frame member with a cross-section in a hollow rectangular shape extended along the vehicle body longitudinal direction. The front end portion of the side sill 13 is connected to the outer side of the rear portion 2i of the front side frame 2 through the out rigger 14. Thus, the side sills 13, which are frame members, support the left and right end portions of the vehicle body floor.

Structure of Cross Member

As shown in FIG. 2, the cross member 15 is a tube shaped frame member disposed substantially along the left/right direction of the vehicle body 1, and is also called a dash lower cross member. The cross member 15 is bridged between the rear portions 2i, 2i of the left and right front side frames 2.

Structure of Tunnel Frame

The tunnel frames 16, shown in FIG. 2, are paired left and right metal hollow members extended along the vehicle longitudinal direction and disposed at the left and right end portions of a tunnel portion, which is arranged at the floor central portion of the vehicle interior R. The two tunnel frames 16 have, for example, a ladder frame structure in a ladder form with bridging members, not shown. The tunnel frames 16 firmly connect and thereby hold the floor frames 17, the out riggers 14, and the partition wall portion 5 (refer to FIG. 1), which are arranged at the front end of the tunnel frames 16.

Structure of Floor Frames

As shown in FIG. 1, the floor members 17 are frame members for holding the floor panel of the vehicle body floor, and are disposed on the floor surface in the vehicle interior R. The floor frames 17 are connected at the front ends thereof with the rear portions 2i of the front side frames 2, connected on the vehicle body central side thereof with the tunnel frames 16, and are welded on the vehicle body outer side thereof with the side surfaces of the left and right side sills 13, the side surfaces being on the vehicle interior side.

Operation of Vehicle Body Front Structure

The operation of the vehicle body front structure according to the present embodiment of the invention will be described below with reference to FIG. 2 and FIGS. 5 to 7, taking an example of a case where the left side of the vehicle front end part of the vehicle C1 has made a narrow offset collision with an oncoming vehicle C2.

Figure 5:
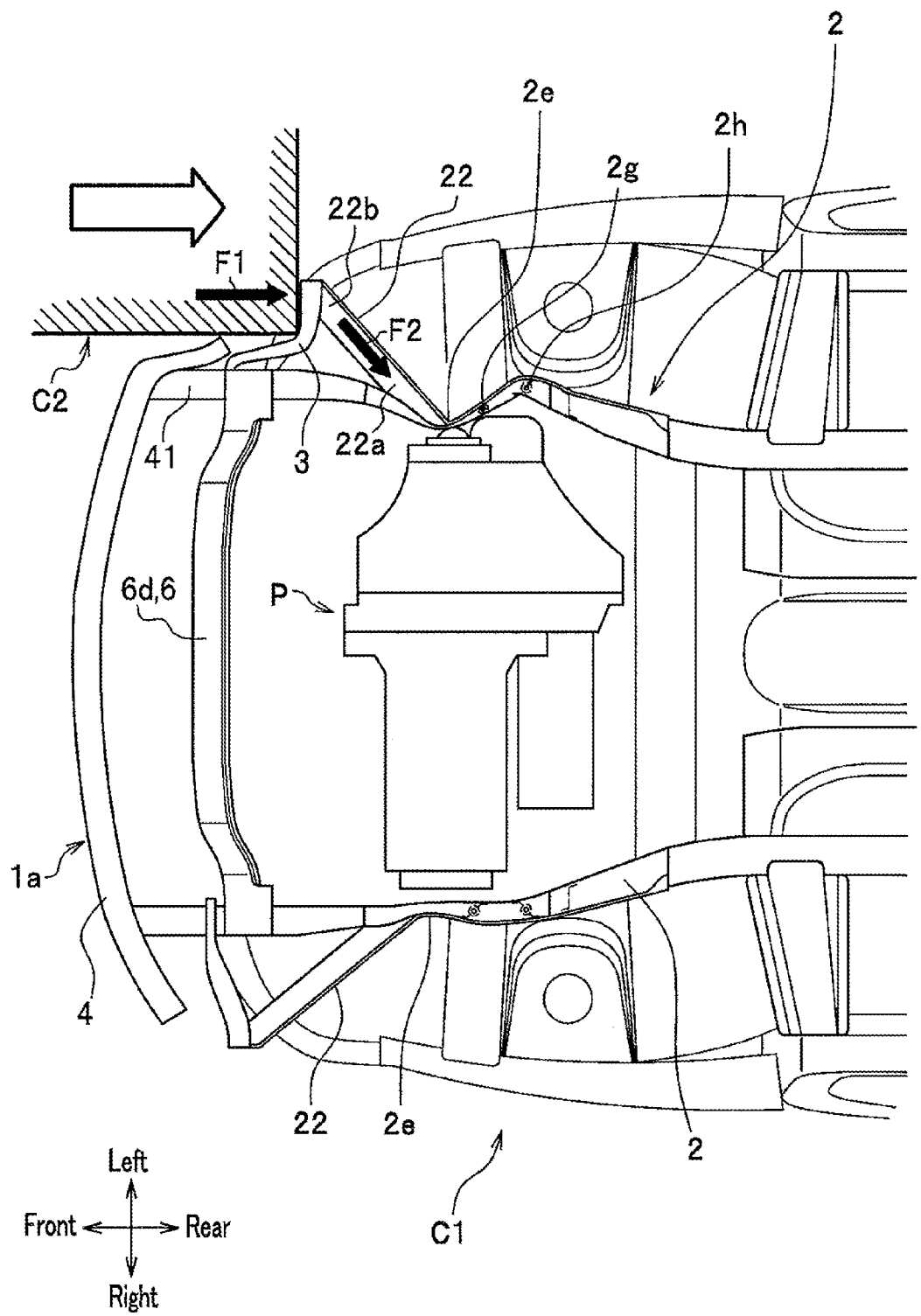
FIG. 5 is a main part schematic bottom view showing a deformation state in an early stage of a narrow offset collision of a vehicle with the vehicle body front structure according to the embodiment of the invention with an oncoming vehicle.

As shown in FIG. 5, when the vehicle C1 according to the invention has made a narrow offset collision with an oncoming vehicle C2, first in the early stage of the collision, the left end portion of the bumper beam 4, the connection member 3, and the branch frame branch frame 22, which are on the left side of the vehicle front end part, are pressed by the oncoming vehicle C2 rearward (in the arrow F1 direction), and the branch frame 22 is pressed obliquely rearward (in the arrow F2 direction). The front side frame 2 is provided, at the rear end portion 22a of the branch frame 22, with the fragile portion 2e, and provided, posterior to the fragile portion 2e, with the mount portions 2g, 2h with high strength, the first partition member 26, and the second partition member 27. Thereby, the fragile portion 2e of the front side frame 2 is weaker and easier to bend than other portions of the front side frame 2.

Further, as the branch frame 22 penetrates the front side frame 2 and is joined with the inner wall 2f, the inner wall 2f is pressed by the branch frame 22 toward the vehicle body central portion side.

Accordingly, the fragile portion 2e is curved to be bent toward the vehicle body central portion side, thus presses the left side end portion of the power unit P to the right, and thereby absorbs the collision energy.

Figure 6:
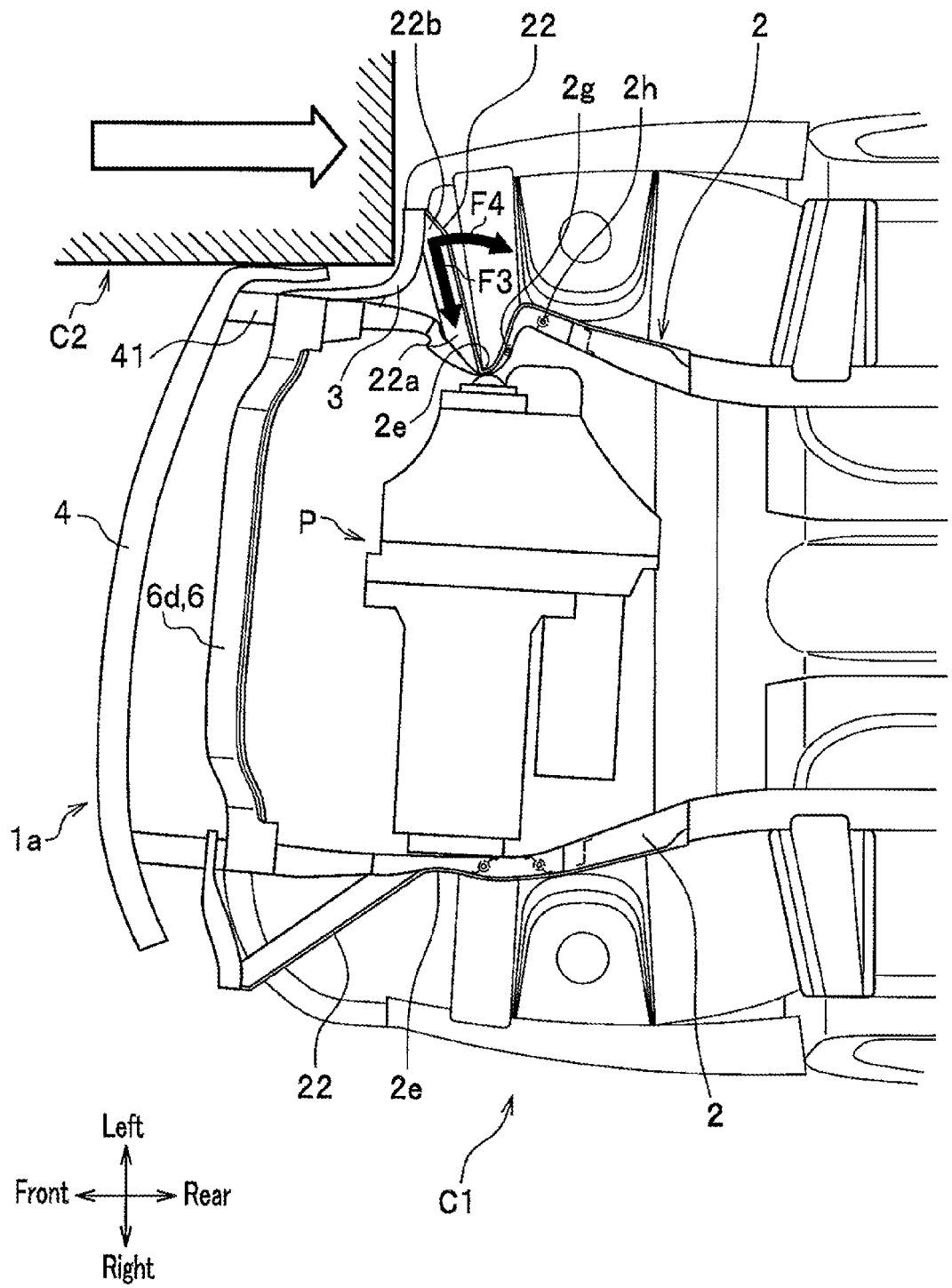
FIG. 6 is a main part schematic bottom view showing a deformation state in a middle stage of the narrow offset collision of the vehicle with the vehicle body front structure according to the embodiment of the invention with the oncoming vehicle.

As shown in FIG. 6, in the collision middle stage, further, the front end portion 22b of the branch frame 22 on the vehicle front part left side is pressed rearward, and the rear end portion 22a thereby moves to the vehicle body central portion side (laterally) to press the power unit P to the right. Still further, while the branch frame 22 is pressing the fragile portion 2e toward the vehicle body central portion (in the arrow F3 direction), the front end portion 22b rotationally moves rearward (in arrow F4 direction) with the rear end portion 22a as the center. The front side frame 2 on the left side presses the rigid power unit P by the fragile portion 2e to the left, the fragile portion 2e thus continues deformation until the right end portion of the power unit P comes in contact with the front side frame 2 on the right side, and the front side frame 2 thereby absorbs the collision energy. As the branch frame 22 on the left side has a strength durable against buckling and bending stress then, the branch frame 22 deforms little.

Figure 7:
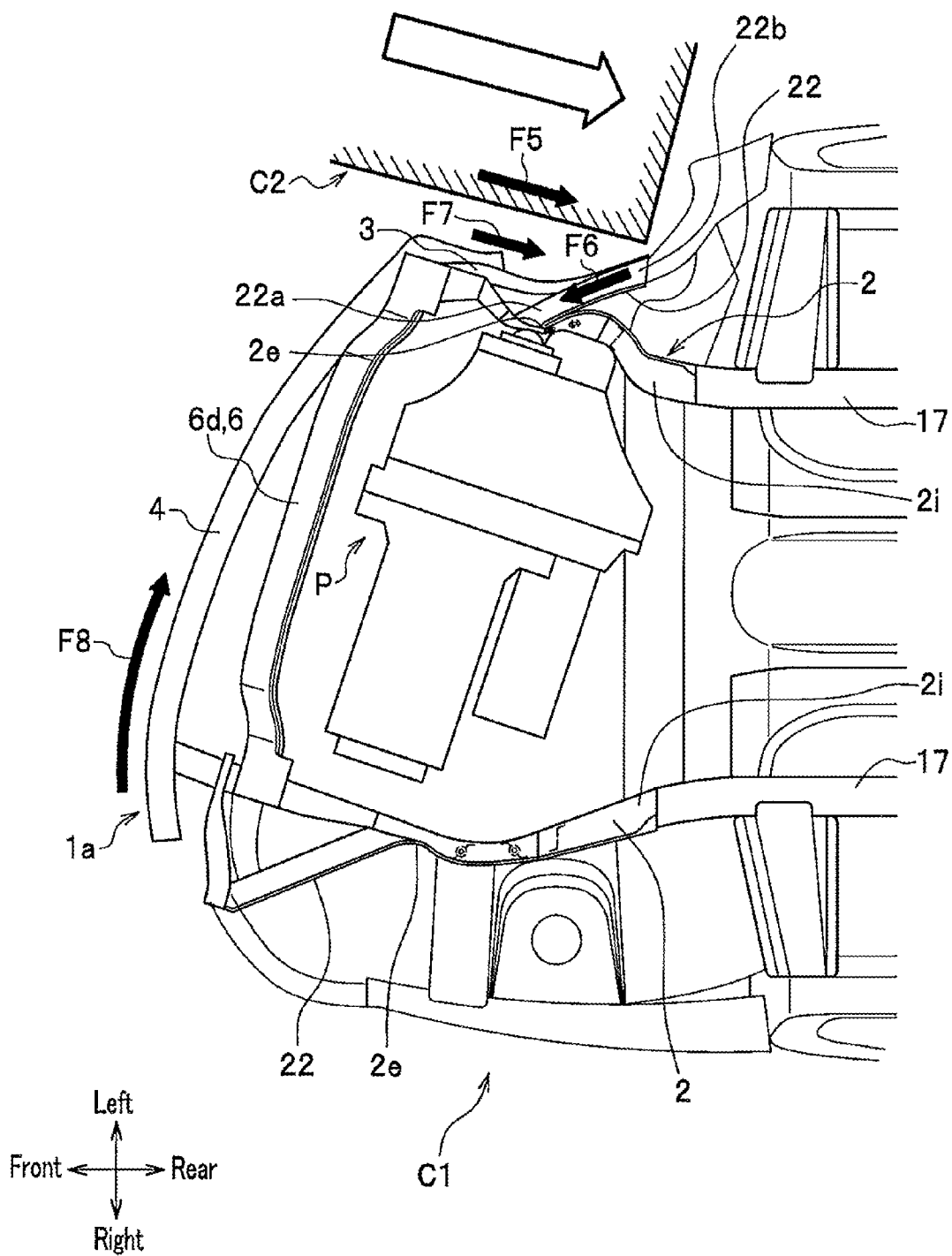
FIG. 7 is a main part schematic bottom view showing a deformation state after completion of the narrow offset collision of the vehicle with the vehicle body front structure according to the embodiment of the invention with the oncoming vehicle.

As shown in FIG. 7, in the final stage, further, the oncoming vehicle C2 presses the branch frame 22 toward the vehicle rear side direction (toward arrow F7 direction), the branch frame 22 with a rigidity larger than that of the front side frame 2 thereby presses the fragile portion 2e toward the vehicle body central portion forward direction (toward arrow F6 direction) while the front end portion 22b of the branch frame 22 rotationally moving posterior to the rear end portion 22a with the fragile portion 2e as the fulcrum point. With this rearward movement of the front end portion 22b of the branch frame 22, the connection member 3 connected with the front end portion 22b moves rearward (in arrow F7 direction) and thereby draws the front portion 2c of the front side frame 2 on the left side to the vehicle lateral outer side, and also draws the front side frame 2 on the right side to the left (in arrow F8 direction) through the bumper beam 4 and the front bulkhead 6. Accordingly, by the bending deformation of the fragile portion 2e, the front side frame 2 absorbs the collision energy.

In such a manner, with the structure of the vehicle body front part 1a according to the present invention, when a narrow offset collision has been made, as shown in FIGS. 8A and 8B, the fragile portion 2e of the front side frame 2 and the branch frame 22, which is provided extending from the fragile portion 2e obliquely forward on the vehicle laterally outer side, promote the deformation of the front side frame 2, and the fragile portion 2e pressed by the branch frame 22 deforms to the vehicle laterally central side to press and thus moves the power unit P. The collision energy can thereby be absorbed significantly more than a conventional case. That is, as shown in FIG. 8B, the fragile portion 2e deformed to the vehicle laterally central side to move the power unit P to the front side frame 2 side on the opposite side, and the deformation amount of the front side frame 2 increased, and the absorption amount of collision energy also increased, corresponding to the movement amount, compared with a conventional case.

Accordingly, for the front side frame 2, the absorption efficiency of collision energy upon a narrow offset collision of the vehicle C1 with a collision object, such as an oncoming vehicle, the rear portion 2i little deforms, and it is thereby possible to reduce effects on the vehicle body 1 having the vehicle interior R.

Further, as shown in FIG. 8C, arrangement is made such that, when the vehicle C1 has made an offset collision, which applies a collision force to the front end of the front side frame 2, the collision force transfers to the floor frame 17 through the front side frame 2.

First Modified Example

The present invention is not limited to the foregoing embodiment, and it is needless to say that various modifications and changes can be made within the spirit of the invention and that these modifications and changes are within the scope of the invention. The same reference symbols will be assigned to elements having been described above, and the description will be omitted below.

Figure 10:
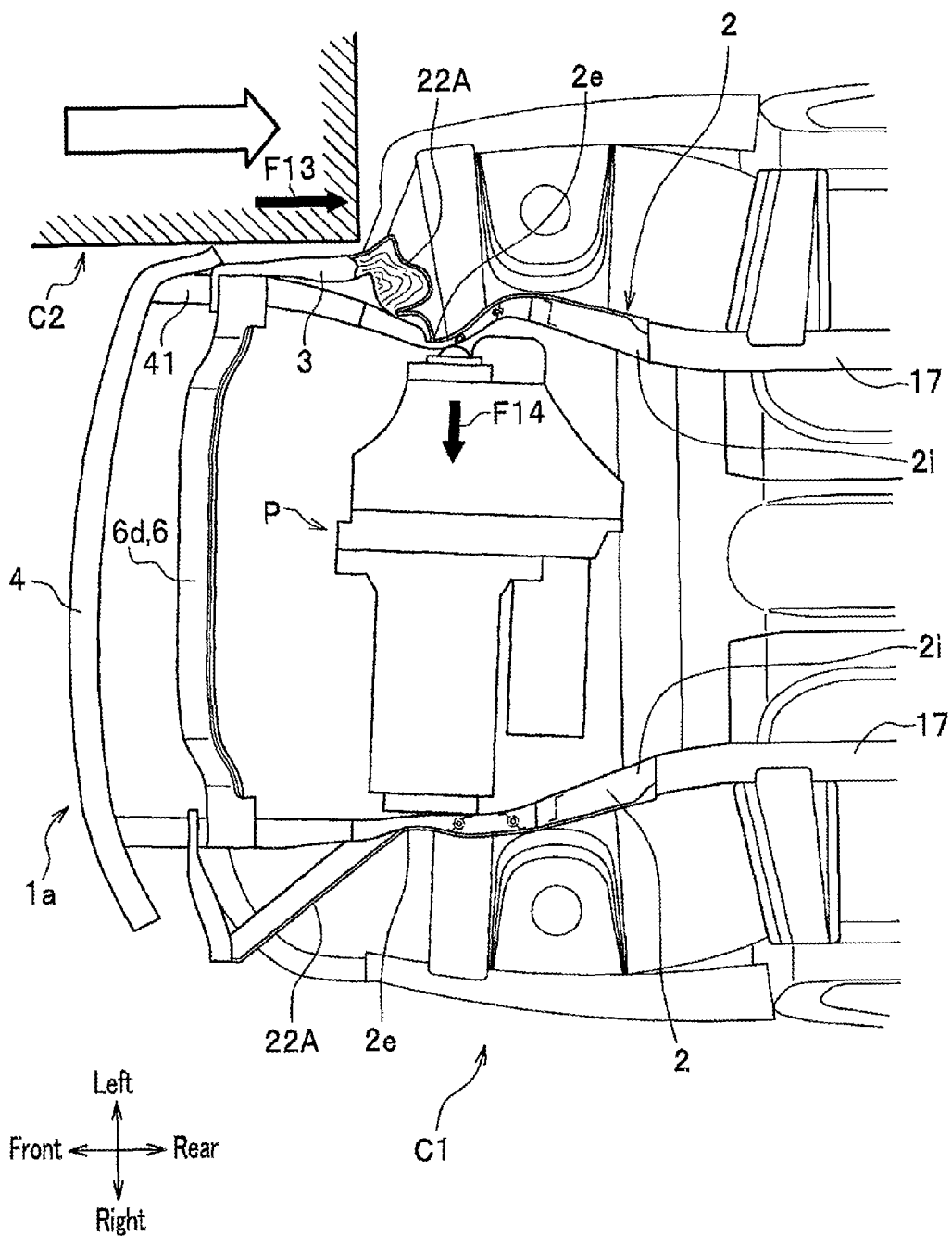
FIG. 10 is a diagram showing the first modified example according to the invention, and is a main part schematic bottom view showing a deformation state in a middle stage of the narrow offset collision of the vehicle with the oncoming vehicle.
Figure 11:
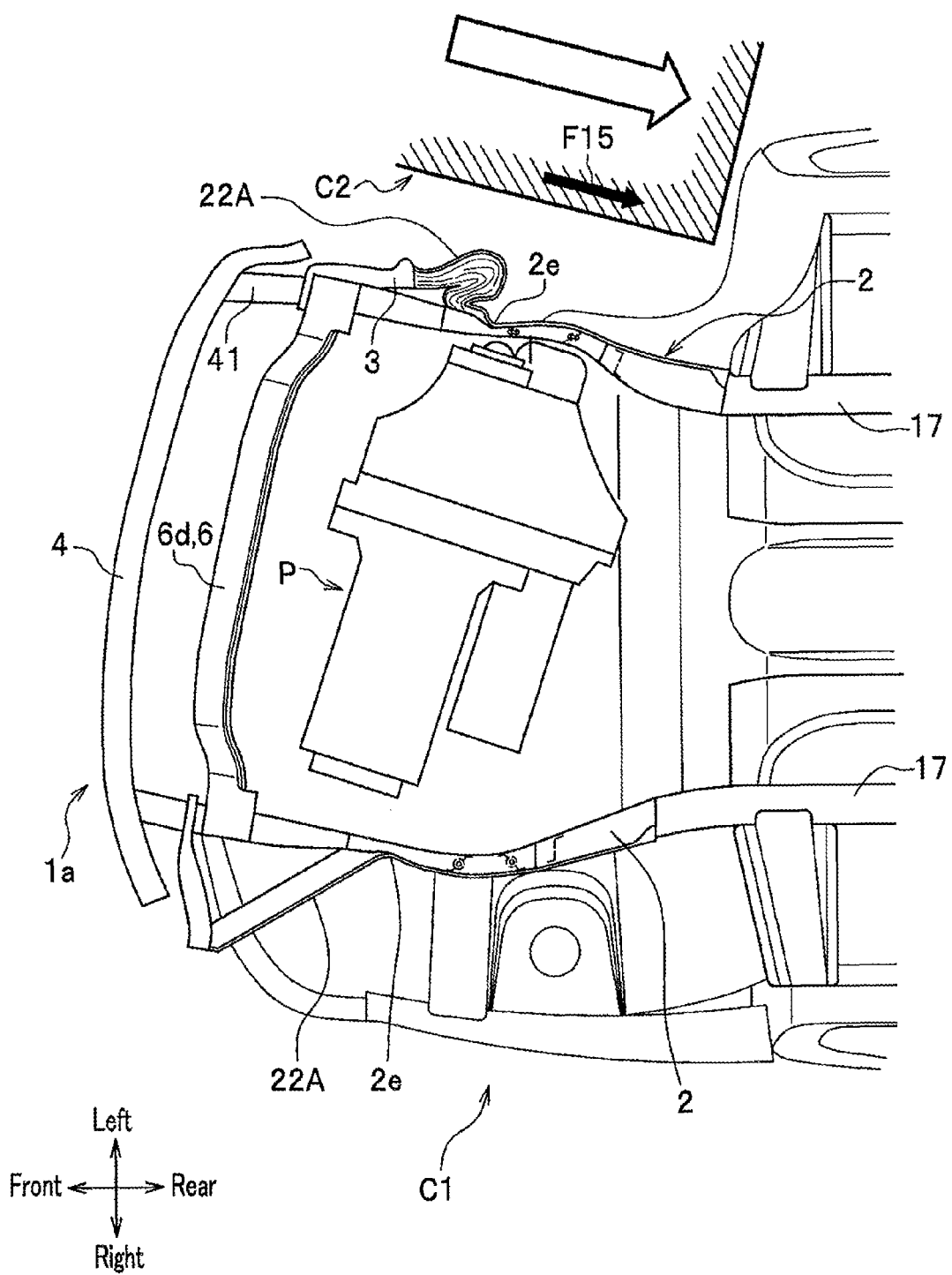
FIG. 11 is a diagram showing the first modified example according to the invention, and is a main part schematic bottom view showing a deformation state after completion of the narrow offset collision of the vehicle with the oncoming vehicle.

FIG. 9 is a diagram showing a first modified example according to the present invention, and is a main part schematic bottom view showing a deformation state in the early stage of a narrow offset collision of a vehicle with an oncoming vehicle. FIG. 10 is a diagram showing the first modified example according to the present invention, and is a main part schematic bottom view showing a deformation state in the middle stage of the narrow offset collision of the vehicle with the oncoming vehicle. FIG. 11 is a diagram showing the first modified example according to the present invention, and is a main part schematic bottom view showing a deformation state after completion of the narrow offset collision of the vehicle with the oncoming vehicle.

In the foregoing embodiment, description has been made on a case where the branch frame 22, as an example of a branch frame 22, is formed by a material with a rigidity higher than that of the front side frame 2, however, the invention is not limited thereto. For example, a branch frame 22A may be formed, as shown in FIGS. 9 to 11, with a rigidity with which axial crush is caused by a reaction force from the power unit P upon collision.

In this case, as shown in FIG. 9, when a vehicle C1 has made a narrow offset collision during driving with an oncoming vehicle C2, first, in the early stage of the collision, the left end portion of the bumper beam 4 on the left side of the vehicle front end part, the connection member 3 and the branch frame 22A are pressed rearward (in arrow F10 direction) by the oncoming vehicle C2, and the branch frame 22A is pressed obliquely rearward (in arrow F11 direction). The fragile portion 2e is pressed and bent by the branch frame 22A to the vehicle body central side to consequently press and move the left side end portion of the power unit P to the right (arrow F12 direction), and the front side frame 2 thereby absorbs the collision energy. The branch frame 22A then starts bending at the central portion thereof.

As shown in FIG. 10, in the collision middle stage, further, the branch frame 22A on the left side of the vehicle front part is pressed rearward (in arrow F13 direction) to thereby bend the fragile portion 2e of the front side frame 2 to the vehicle body central portion side; the power unit P is thereby pressed and moved to the right (arrow F14 direction); and the power unit P thereby comes in contact with the front side frame 2 on the right side. Then, the branch frame 22A is sandwiched between the connection member 3 pressed by the oncoming vehicle C2 and the front side frame 2 on the left side, which is supported by the front side frame 2 on the opposite side (right side) through the rigid power unit P, the branch frame 22A consequently crushes, buckles, and deforms, and the collision energy is thereby absorbed.

As shown in FIG. 11, in the final stage of collision, the oncoming vehicle C2 presses the branch frame 22A to the vehicle rear side (arrow F15 direction), and the branch frame 22A thereby crushes more. Corresponding to the crush amount of the branch frame 22A and the movement amount of the power unit P, the collision energy is absorbed more than a conventional case, and the effects on the members forming the vehicle interior R can be deduced.

In such a manner, for the structure of the vehicle body front part 1a according to the present invention, even in a case that the rigidity of the branch frame 22A is decreased from that in the foregoing embodiment so that the branch frame 22A has a strength that causes crushing and buckling by the collision force upon a narrow offset collision, the branch frame 22A crushes; the front side frame 2 deforms; the power unit P moves; and the collision energy upon a narrow offset collision can thereby be efficiently absorbed. Thus, it is possible to inhibit the vehicle body front part 1a from moving rearward to the vehicle interior R side.

Second Modified Example

Figure 12:
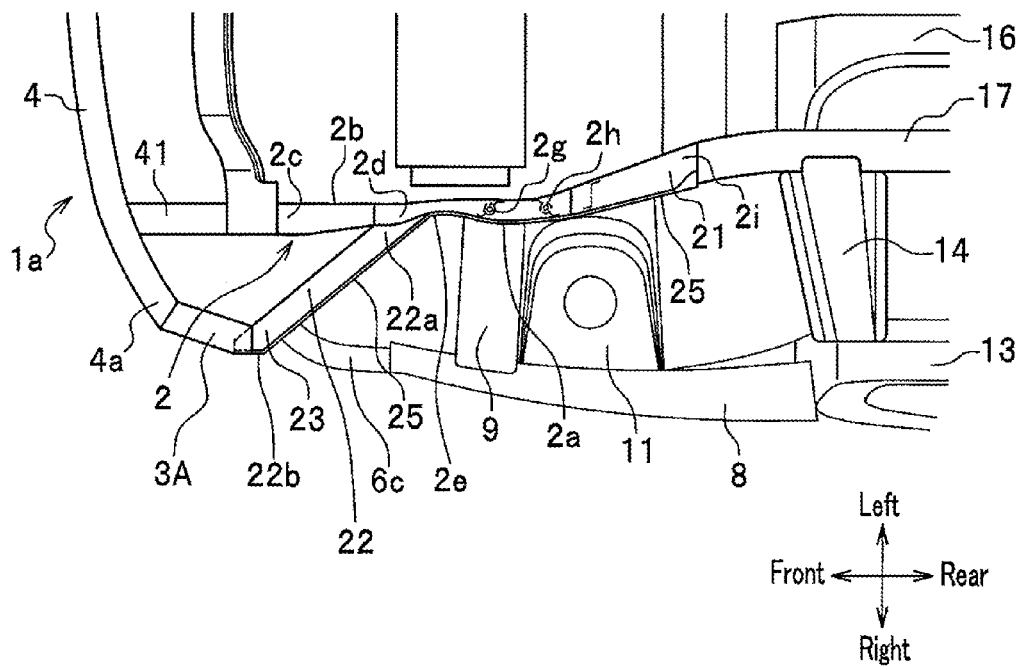
FIG. 12 is a diagram showing a second modified example according to the invention, and is a main part schematic bottom view showing a fitting state of a connection member.

FIG. 12 is a diagram showing a second modified example according to the present invention, and is a main part schematic bottom view showing a state of fitting a connection member.

In the foregoing embodiment, as an example of the connection member 3, as shown in FIGS. 2 and 3, description was made, taking an example of a case where the connection member 3 connects the front portion 2c of the front side frame 2 and the front end portion 22b of the branch frame 22, however, the invention is not limited thereto.

As shown in FIG. 12, a connection member 3A may be disposed such as to connect the front end portion 22b of the branch frame 22 and an end portion 4a, on the vehicle laterally outer side, of the bumper beam 4, which is disposed at the front portion 2c of the front side frame 2, wherein the bumper beam extension 41 is disposed between the bumper beam 4 and the front portion 2c of the front side frame 2.

In this case, the connection member 3A is only required to be arranged in a state of being connected with the front end portion 22b of the branch frame 22 and the end portion 4a, on the vehicle laterally outer side, of the bumper beam 4 which is anterior to the front side frame 2, and the connection member 3A may be integrally formed with the bumper beam 4 or the branch frame 22.

Third Modified Example

Figure 13:
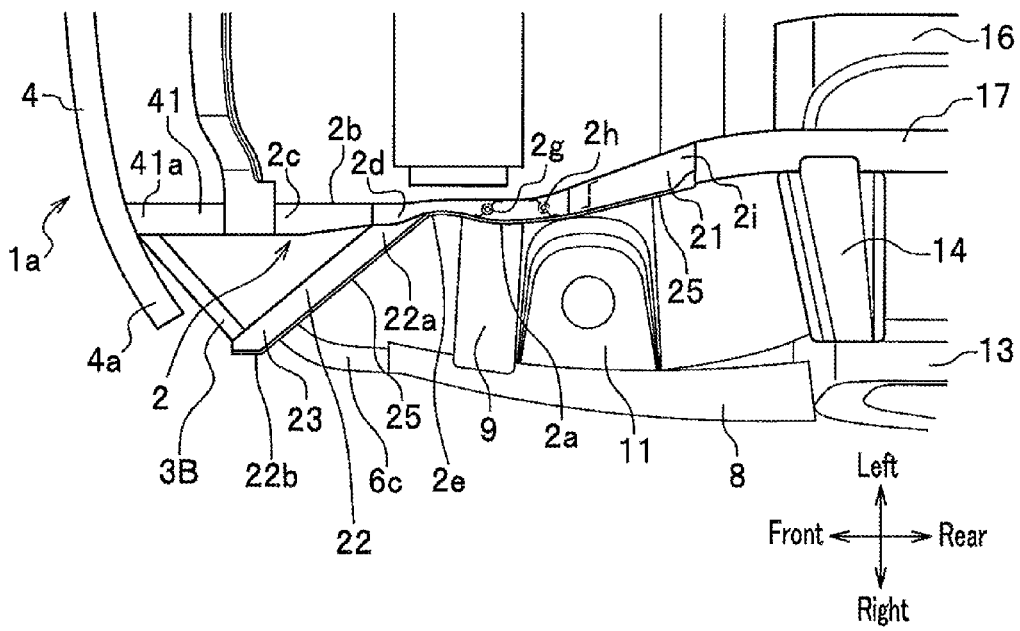
FIG. 13 is a diagram showing a third modified example according to the invention, and is a main part schematic bottom view showing a fitting state of a connection member.

FIG. 13 is a diagram showing a third modified example according to the present invention, and is a main part schematic bottom view showing a state of fitting a connection member.

Further, a connection member 3B shown in FIG. 13 may be disposed such as to connect the front end portion 22b of the branch frame 22 and a front end portion 41a of the bumper beam extension 41 connected with the rear portion of the bumper beam 4.

Fourth Modified Example

Figure 14:
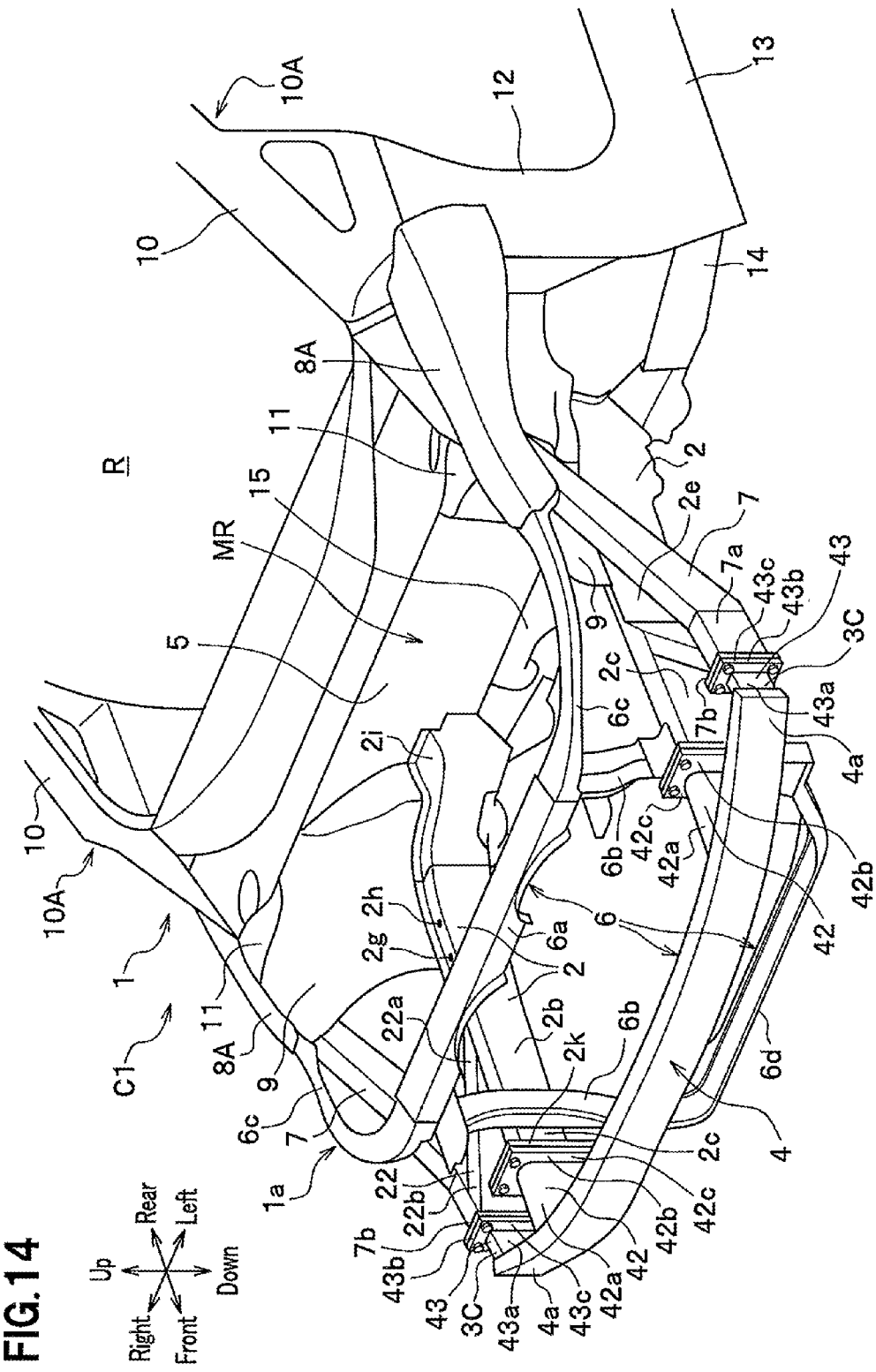
FIG. 14 is a diagram showing a fourth modified example according to the invention, and is a main part schematic perspective view showing a vehicle body front structure.

FIG. 14 is a diagram showing a fourth modified example according to the present invention, and is a main part schematic perspective view showing a vehicle body front structure.

In the description in the foregoing embodiment, bumper beam extensions 41 as shock-absorbing members are arranged, in one for each, between the bumper beam 4 and the paired left and right connection members 3 (refer to FIG. 1), however, as shown in FIG. 14, inner bumper beam extensions 42 and outer bumper beam extensions 43 may be provided respectively at the left and right rear portions of the bumper beam 4.

In this case, the inner bumper beam extensions 42 are shock-absorbing members formed by a material which is substantially the same as that of the bumper beam extensions 41 in the foregoing embodiment. The flange portions 42c of the rear end portions 42b of the inner bumper beam extensions 42 are respectively fastened by bolts with the flange portions 2k of the respective front portions 2c of the left and right front side frames 2, 2 and the front end portions 42a of the inner bumper beam extensions 42 are joined with the rear surface of the bumper beam 4.

As shown in FIG. 14, the outer bumper beam extensions 43 are, for example, shock-absorbing members formed in an angular tube shape, and also have a function as connection members 3C similarly to the connection members 3 in the foregoing embodiment. That is, the front end portions 43a of the outer bumper beam extensions 43 (connection members 3C) are connected to the front portions 2c of the front side frames 2 through the bumper beam 4 and the inner bumper beam extensions 42. The flange portions 43c of the rear end portions 43b of the outer bumper beam extensions 43 are fastened with bolts to the flange portions 7b of the front end portions 7a of the lower members 7. The outer bumper beam extensions 43 are arranged such that the rear end portions 43b are disposed at the front end portions 22b of the branch frames 22 and the front end portions 7a of the lower members 7, and the front end portions 43a are joined with the rear surface of the bumper beam 4.

The front end portions 42a of the inner bumper beam extensions 42 and the front end portions 43a of the outer bumper beam extensions 43 are respectively joined with the left and right portions of the bumper beam 4, along the front/rear direction at the same height with an appropriate distance between the front end portions 42a and the front end portions 43a.

Upper members 8A are vehicle body frames extending forward from front pillars 10A, and the front end portions are joined with the lower members 7 and the bulkhead upper sides 6c.

Each front pillar 10A includes a front pillar upper 10 and a front pillar lower 12. The rear end portion of the upper member 8A is joined near the joint portion between the front pillar upper 10 and the front pillar lower 12.

Each lower member 7 is a vehicle body frame in an angular tube shape arranged extending front-downward and obliquely from the front end portion of the upper member 8A. The front end portion 7a of the lower member 7 is disposed on the side outer than the front side frame 2 and at the same height as the front side frame 2, and is connected with the rear end portion 43b of the outer bumper beam extension 43

When the right side of the vehicle front end part of the vehicle C1 has made a narrow offset collision with an oncoming vehicle C2, the vehicle body front structure in the fourth modified example with such a structure becomes as described below.

Figure 15:
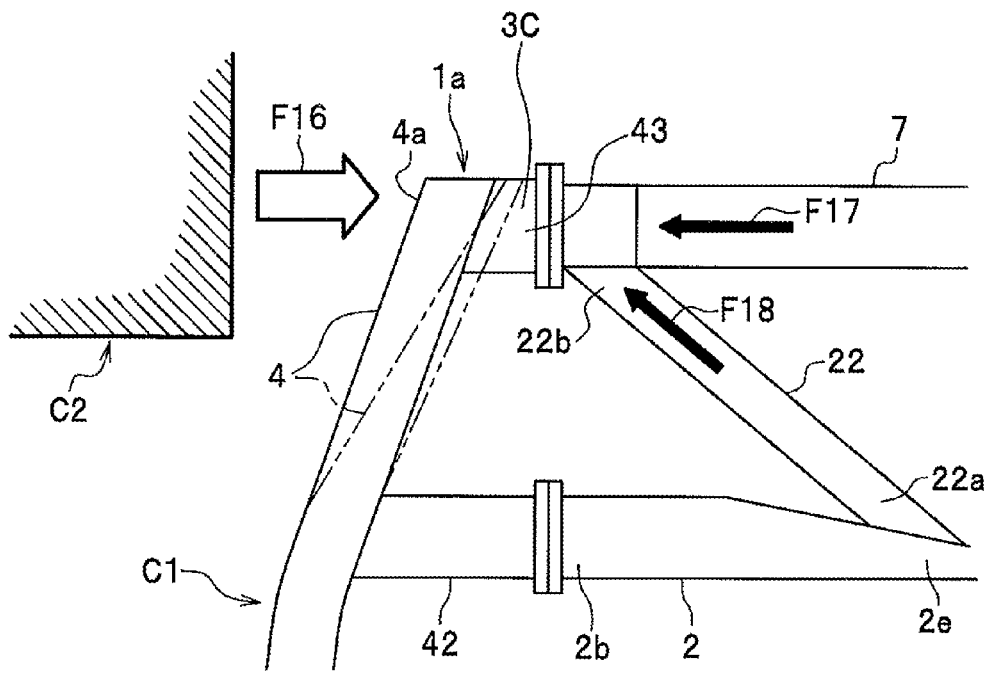
FIG. 15 is a diagram showing the fourth modified example according to the invention, and is a main part schematic bottom view showing a deformation state after completion of a narrow offset collision of a vehicle in a low speed state with an oncoming vehicle.

FIG. 15 is a diagram showing the fourth modified example according to the invention, and is a main part schematic bottom view showing a deformation state after completion of a narrow offset collision of the vehicle in a low speed state with an oncoming vehicle.

As shown in FIG. 15, when the vehicle C1 has made a narrow offset collision in a low speed state with the oncoming vehicle C2, a collision force F16 smaller than that during a high speed drive is applied to the end portion 4a on the vehicle laterally outer side of the right side of the bumper beam 4, and the end portion 4a on the vehicle laterally outer side is thereby pressed rearward. With the collision force F16, the outer bumper beam extension 43 is crushed, and is supported by the lower member 7 with a reaction force F17 and by the branch frame 22 with a reaction force F18. Accordingly, the outer bumper beam extension 43 is crushed and deformed, thereby absorbs the collision force F16, while the vehicle body frames, namely, the lower member 7, the branch frame 22, the front side frame 2, and the like are not deformed.

Consequently, in a case of repairing the vehicle C1 having made a narrow offset collision, as it is only necessary to replace the outer bumper beam extension 43 and the bumper beam 4, it is possible to decrease the number of parts requiring repair or replacement and to thereby reduce the repair cost.

Figure 16:
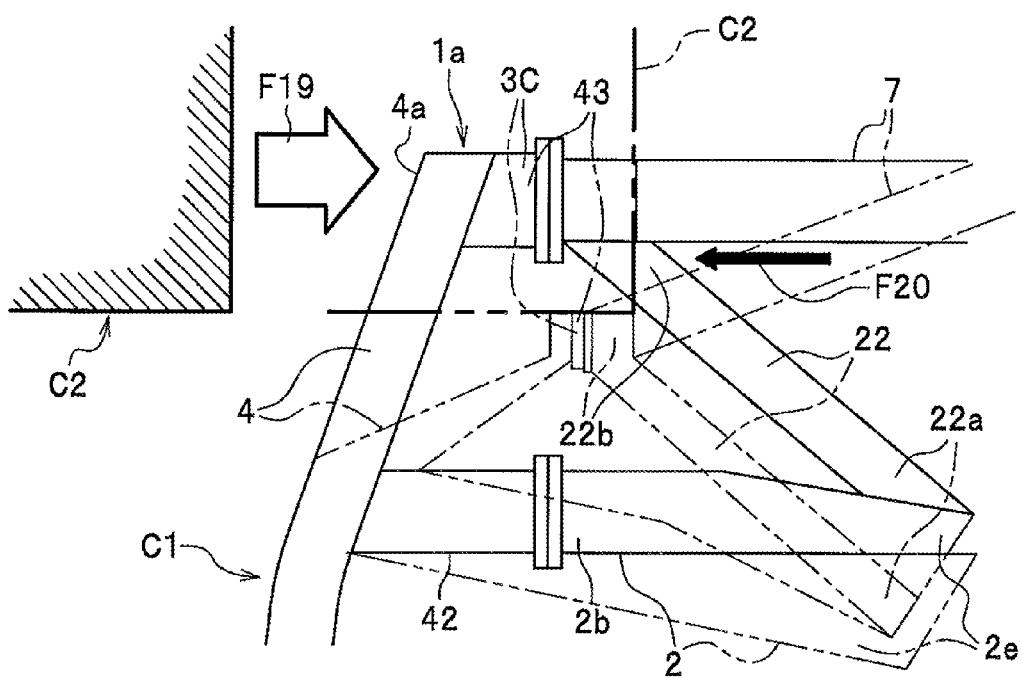
FIG. 16 is a diagram showing the fourth modified example according to the invention, and is a main part schematic bottom view showing a deformation state after completion of a narrow offset collision of the vehicle in a high speed state with an oncoming vehicle.

FIG. 16 is a diagram showing the fourth modified example according to the invention, and is a main part schematic bottom view showing a deformation state after completion of the narrow offset collision of the vehicle in a high speed state with an oncoming vehicle.

As shown in FIG. 16, when the vehicle C1 has made a narrow offset collision in a state of a high speed drive with an oncoming vehicle C2, a collision force F19 larger than that during a low speed drive is applied to the end portion 4a on the vehicle laterally outer side of the right side of the bumper beam 4, and the end portion 4a on the vehicle laterally outer side is thereby pressed rearward. With the collision force F16, the outer bumper beam extension 43 is crushed; the branch frame 22 presses and bends the fragile portion 2e of the front side frame 2; and while supporting with a reaction force F20, the lower member 7 deforms to the vehicle central side, and the collision force F19 is absorbed in such a manner.

Consequently, the front side frame 2 can efficiently absorb the collision force F19, at the vehicle body front part 1a even when the front side frame 2 is longitudinally short. Therefore, it possible to reduce deformation of members that form the vehicle interior R that is posterior to the vehicle body front part 1a.

Fifth Modified Example

Figure 17:
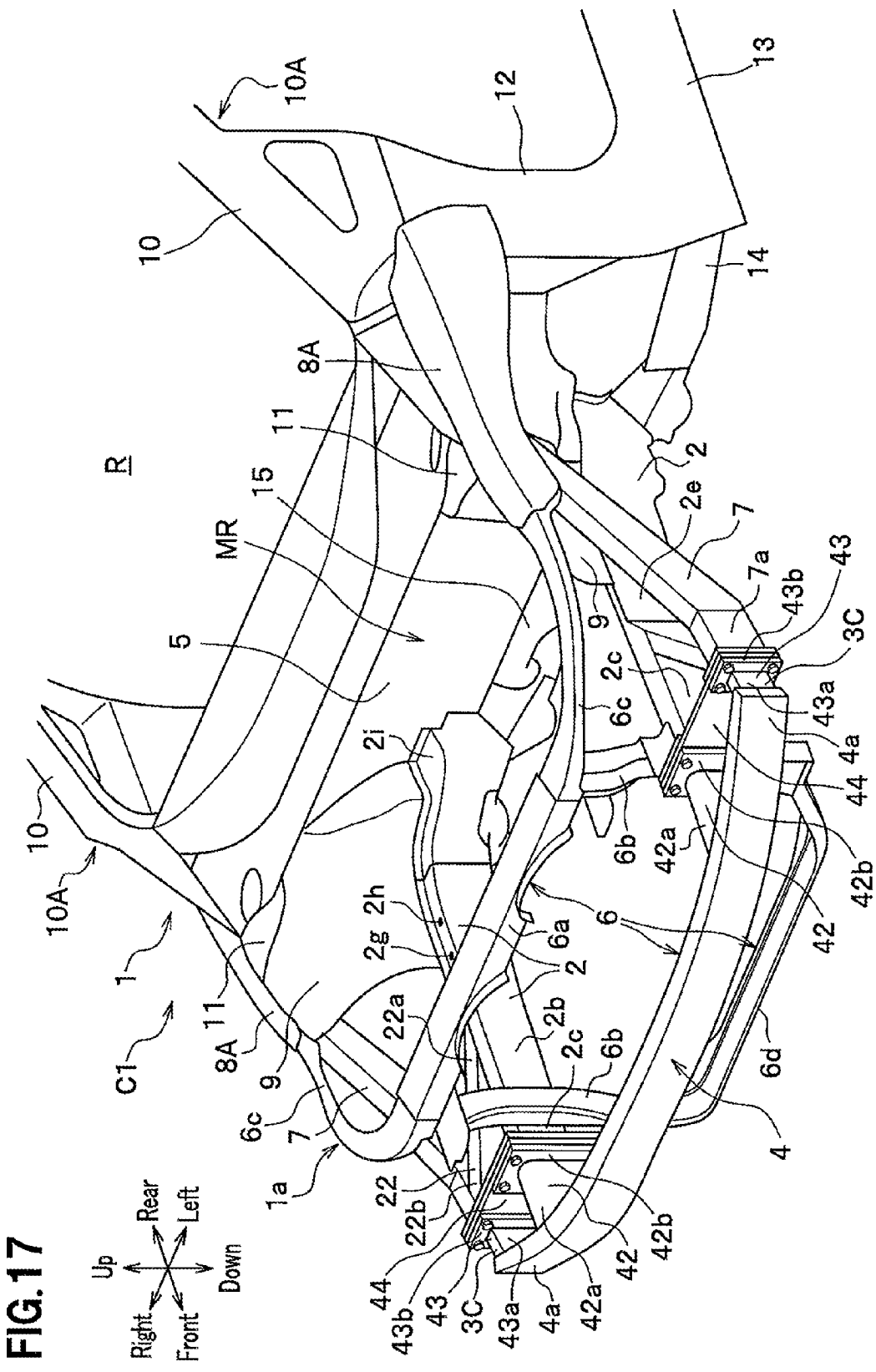
FIG. 17 is a diagram showing a fifth modified example according to the invention, and is a main part schematic perspective view showing a vehicle body front structure.
Figure 18:
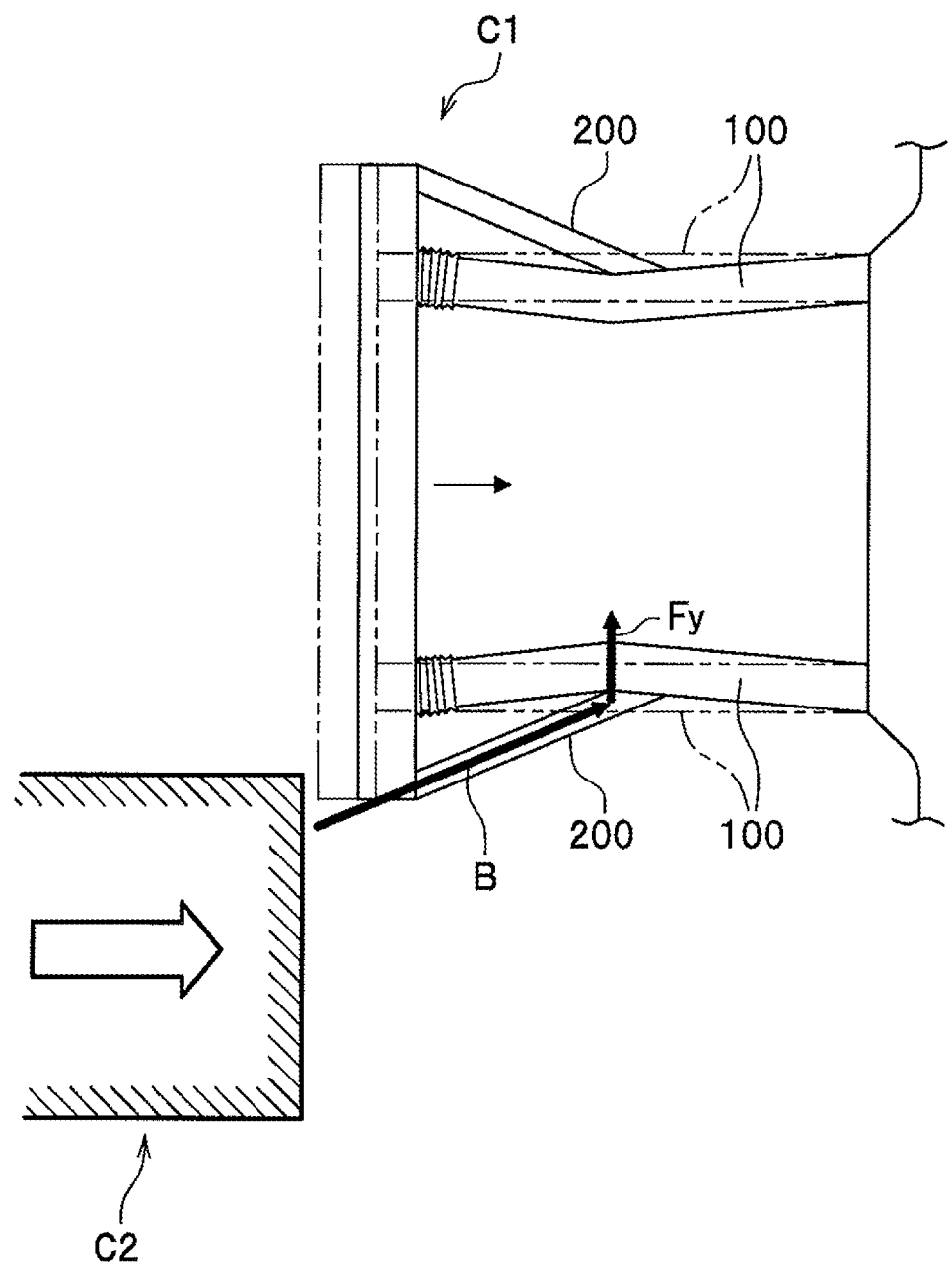
FIG. 18 is a main part schematic view showing a state when a conventional vehicle described in Patent Document 1 has made a narrow offset collision with an oncoming vehicle.

FIG. 17 is a diagram showing a fifth modified example according to the invention, and is a main part schematic perspective view showing a vehicle body front structure.

The inner bumper beam extensions 42 and the outer bumper beam extensions 43 (refer to FIG. 14), described in the fourth modified example, may be connected by fitting plates 44, as shown in FIG. 17.

In this case, the fitting plates 44 are formed by a metal thick material. The inner side (vehicle body central side) of each fitting plate 44 is fastened by bolts and welded in a state of being sandwiched between the flange portion of the front portion 2c of the front side frame 2 and the flange portion of the rear end portion 42b of the inner bumper beam extension 42. The outer side (vehicle body outer side) of each fitting plate 44 is fastened by bolts and welded in a state of being sandwiched between the flange portion of the front end portion 7a of the lower member 7 and the flange portion of the rear end portion 43b of the outer bumper beam extension 43.

In such a manner, as the inner bumper beam extensions 42 and the outer bumper beam extensions 43 are connected by the fitting plates 44, when the vehicle C1 has made a narrow offset collision with an oncoming vehicle C2, the branch frame 22 is displaced such as to rearward draw the fitting plate 44 in addition to the bumper beam 4 and the connection member 3C and thus presses the fragile portion 2e of a front side frame 2. Thus, it is possible to transfer the collision force, directing to a greater degree the collision force along the angled branch frame 22 and toward the power unit P (refer to FIGS. 9 and 10) side. Consequently, the branch frame 22 can be deformed such that the power unit P presses the front side frame 2 on the opposite side. As a result, the front side frame 2 absorbs the collision energy by the deformation, and it is thereby possible to improve the absorptivity of collision energy upon a narrow offset collision.

Other Modified Examples

In the foregoing embodiment, description was made on a case that the power unit P, shown in FIG. 2, is fitted to the mount portions 2g, 2h of the front side frames 2 through mount members (not shown), however, the invention is not limited thereto. The power unit P may be fitted to the mount portions 2g, 2h of the front side frames 2 through mount members and sub-frames, not shown.

Further, description was made on a case that front side frames 2, branch frames 22, 22A, and other frame members are formed by angular tube frames, however, tube shape members with other shapes, such as a cylindrical shape, may be employed. Further, these frame members are only required to be formed by materials with a high rigidity, and it is possible to employ light alloys, such as aluminum alloy, and resin materials.

What is claimed is:
1. A vehicle body front structure, comprising:
left and right front side frames arranged at a front part of a vehicle body and extending in a longitudinal direction of the vehicle body;
a power unit disposed at a longitudinal center between the left and right front side frames; and a left branch frame extending along a left oblique forward direction on a vehicle lateral left outer side from the left front side frame beside the power unit, and a right branch frame extending along a right oblique forward direction on a vehicle lateral right outer side from the right front side frame beside the power unit, wherein the left branch frame passes through an outer surface of the left front side frame and a rear end portion of the left branch frame extends along an inner wall of the left front side frame, and the right branch frame passes through an outer surface of the right front side frame and a rear end portion of the right branch frame extends along an inner wall of the right front side frame, wherein a front end portion of the left branch frame is connected with a front portion of the left front side frame through a left connection member, and a front end portion of the right branch frame is connected with a front portion of the right front side frame through a right connection member, wherein the left front side frame includes a left front side frame main body, and the right front side frame includes a right front side frame main body, the left and right front side frame main bodies each being substantially angular C-shaped in a vertical cross-sectional view wherein the left branch frame includes: a left side frame engagement portion provided along the longitudinal direction of the vehicle body, the left side frame engagement portion connected inside an opening portion of the left front side frame main body; and a left angled portion provided from a front end of the left side frame engagement portion toward the left oblique forward direction on the vehicle lateral left outer side, and wherein the right branch frame includes: a right side frame engagement portion provided along the longitudinal direction of the vehicle body, the right side frame engagement portion connected inside an opening portion of the right front side frame main body; and a right angled portion provided from a front end of the right side frame engagement portion toward the right oblique forward direction on the vehicle lateral right outer side.

2. The vehicle body front structure according to claim 1, wherein the left front side frame includes a left fragile portion provided posterior to a left connection portion for connection with the left branch frame, and the right front side frame includes a right fragile portion provided posterior to a right connection portion for connection with the left branch frame.

3. The vehicle body front structure according to claim 2, wherein the left front side frame includes a left mount portion for supporting the power unit, the left mount portion arranged posterior to the left fragile portion, and the right front side frame includes a right mount portion for supporting the power unit, the right mount portion arranged posterior to the right fragile portion.

4. The vehicle body front structure according to claim 3, wherein each of the left and right front side frames is tube shaped in a vertical cross-sectional view, and wherein the left mount portion includes a left partition member for longitudinally partitioning inside the left front side frame, and the right mount portion includes a right partition member for longitudinally partitioning inside the right front side frame.

5. The vehicle body front structure according to claim 1, wherein each of the left and right connection members is a plate member disposed posterior to an associated bumper beam, at an end portion of the associated bumper beam on the vehicle lateral left and right outer sides, respectively, or at a front end portion of an associated bumper beam extension.

6. The vehicle body front structure according to claim 1, wherein each of the left and right branch frames has a rigidity free from axial crush by a reaction force from the power unit upon collision.

7. The vehicle body front structure according to claim 1, wherein each of the left and right branch frames has a rigidity that is axially crushed by a reaction force from the power unit upon collision.

8. A vehicle body front structure, comprising:

left and right front side frames arranged at a front part of a vehicle body and extending in a longitudinal direction of the vehicle body;

a power unit disposed at a longitudinal center between the left and right front side frames; and a left branch frame extending along a left oblique forward direction on a vehicle lateral left outer side from the left front side frame beside the power unit, and a right branch frame extending along a right oblique forward direction on a vehicle lateral right outer side from the right front side frame beside the power unit, wherein the left branch frame passes through an outer surface of the left front side frame and a rear end portion of the left branch frame extends along an inner wall of the left front side frame, and the right branch frame passes through an outer surface of the right front side frame and a rear end portion of the right branch frame extends along an inner wall of the right front side frame, wherein a front end portion of the left branch frame is connected with a front portion of the left front side frame through a left connection member, and a front end portion of the right branch frame is connected with a front portion of the right front side frame through a right connection member, and wherein the vehicle body front structure further comprises:

outer bumper beam extensions disposed at respective front end portions of the left and right branch frames and also function as the left and right connection members;

inner bumper beam extensions disposed at respective front portions of the left and right front side frames;

a bumper beam disposed at front ends of the inner bumper beam extensions and the outer bumper beam extensions;

upper members extending forward from front pillars; and lower members extending forward downward from the upper members, wherein front end portions of respective lower members are disposed outwardly relative to the left and right front side frames and connected to rear end portions of the outer bumper beam extensions.

9. The vehicle body front structure according to claim 8, further comprising fitting plates that connect the inner bumper beam extensions and the outer bumper beam extensions.

10. The vehicle body front structure according to claim 2, wherein each of the left and right connection members is a plate member disposed posterior to an associated bumper beam, at an end portion of the associated bumper beam on the vehicle lateral left and right outer sides, or at a front end portion of an associated bumper beam extension.

11. The vehicle body front structure according to claim 10, wherein each of the left and right branch frames has a rigidity free from axial crush by a reaction force from the power unit upon collision.

12. The vehicle body front structure according to claim 10, wherein each of the left and right branch frames has a rigidity that is axially crushed by a reaction force from the power unit upon collision.

13. The vehicle body front structure according to claim 10, further comprising:

outer bumper beam extensions disposed at respective front end portions of the left and right branch frames and also function as the left and right connection members;

inner bumper beam extensions disposed at respective front end portions of the left and right front side frames;

a bumper beam disposed at front ends of the inner bumper beam extensions and the outer bumper beam extensions;

upper members extending forward from front pillars; and lower members extending forward downward from the upper members, wherein front end portions of respective lower members are disposed outwardly relative to the left and right front side frames and connected to rear end portions of the outer bumper beam extensions.

14. The vehicle body front structure according to claim 13, further comprising fitting plates that connect the inner bumper beam extensions and the outer bumper beam extensions.

* * * * *